US006631447B1

United States Patent
Morioka et al.

(10) Patent No.: US 6,631,447 B1
(45) Date of Patent: Oct. 7, 2003

(54) MULTIPROCESSOR SYSTEM HAVING CONTROLLER FOR CONTROLLING THE NUMBER OF PROCESSORS FOR WHICH CACHE COHERENCY MUST BE GUARANTEED

(75) Inventors: Michio Morioka, Hitachi (JP); Kenichi Kurosawa, Hitachi (JP); Tetsuaki Nakamikawa, Hitachi (JP); Sakoh Ishikawa, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/824,411

(22) Filed: Mar. 26, 1997

Related U.S. Application Data

(63) Continuation of application No. 08/214,764, filed on Mar. 18, 1994, now abandoned.

(30) Foreign Application Priority Data

Mar. 18, 1993 (JP) .............................................. 5-058332

(51) Int. Cl.[7] .............................................. G06F 12/08
(52) U.S. Cl. ........................ 711/141; 711/118; 711/124
(58) Field of Search ............................... 711/100, 118, 711/124, 141, 146, 154, 117, 122

(56) References Cited

U.S. PATENT DOCUMENTS

| | | | | |
|---|---|---|---|---|
| 4,622,631 A | * | 11/1986 | Frank et al. ................. | 395/800 |
| 5,058,006 A | * | 10/1991 | Durdan et al. ............... | 395/449 |
| 5,197,139 A | * | 3/1993 | Emma et al. ................ | 395/417 |
| 5,303,362 A | * | 4/1994 | Butts, Jr. et al. ........... | 395/448 |
| 5,313,609 A | * | 5/1994 | Baylor et al. ............... | 395/448 |
| 5,319,766 A | * | 6/1994 | Thaller et al. .............. | 395/473 |
| 5,388,242 A | * | 2/1995 | Jewett ......................... | 395/440 |
| 5,522,058 A | * | 5/1996 | Iwasa et al. ................. | 395/472 |

OTHER PUBLICATIONS

Lenoski, et al., The Directory–Based Cache Coherence Protocol for the DASH Multiprocessor, Proc. 17th Int. Symp. on Comp. Arch., p148–159 1990.*

(List continued on next page.)

Primary Examiner—Tuan V. Thai
(74) Attorney, Agent, or Firm—Antonelli, Terry, Stout & Kraus, LLP

(57) ABSTRACT

To provide a large scale multiprocessor system capable of executing an area limited cache coherency control implementing a high speed operation while substantially reducing the amount of processor-to-processor communications there is provided a translation lookaside buffer which retains cache coherency attribute information defining a limitable cache coherent area to maintain data consistency among caches, and a processor memory interface unit includes a cache coherency control which identifies whether cache coherency is required only within a particular cluster of processors or is required for every one of the cache memories in every one of the clusters throughout the system, on the basis of the contents of the cache coherency attribute information. Further, in another version of large scale multiprocessor system, each cluster may be provided with an export directory which registers an identifier of data whose copy is cached in cache memories in other clusters. Thereby, latency in cache coherency procedures can be reduced greatly, since a cache coherent area can be limited in dependence on various characteristics of data. Further, it is also possible to greatly reduce inter-cluster communication quantities, since it is no longer necessary to broadcast to all processors in the system upon every occasion of a memory read/write.

16 Claims, 16 Drawing Sheets

OTHER PUBLICATIONS

Daniel Lenoski, et al., "The DASH Prototype: Implementation and Performance", Proc. 19th Int. Symp. on Computer Architecture, 1992.

David B. Gustavson, "The Scalable Coherent Interface and Related Standards Projects", IEEE MICRO, pp. 10–22, 1992.

The IBm Research Parallel Processor Prototype (PR3): Introduction and Architecture, Proc. of the 1985 Int. Conf. on Parallel Processing, pp. 764–771, 1985.

The Directory–Based Cache Coherence Protocol for the DASH Multiprocessor (1990).

An Economical Solution to the Cache Coherence Problem (1984).

Hierarchical Cache/Bus Architecture for Shared Memory Multiprocessors (1987).

European Patent Application 0 438 211 A2 (1991).

* cited by examiner

FIG. 6

| NO | MEMORIES TO BE ACCESSED | PAGE ATTRIBUTES | CACHE COHERENCY AREA | CACHABLE/ NON-CACHABLE |
|---|---|---|---|---|
| 1 | LOCAL SHARED MEMORY WITHIN CLUSTER | LOCAL CACHE COHERENCY | INTRA-CLUSTER CACHES ALONE | CACHABLE |
| 2 | | GLOBAL CACHE COHERENCY | ENTIRE CACHES | CACHABLE |
| 3 | LOCAL SHARED MEMORIES WITHIN EXTERNAL CLUSTERS | LOCAL CACHE COHERENCY | IBID | NON-CACHABLE |
| 4 | | GLOBAL CACHE COHERENCY | IBID | CACHABLE |
| 5 | GLOBAL SHARED MEMORY | ~~LOCAL CACHE COHERENCY~~ | | |
| 6 | | GLOBAL CACHE COHERENCY | IBID | CACHABLE |

SCHEMATIC CONFIGURATION OF COMPUTER SYSTEM ARCHITECTURE

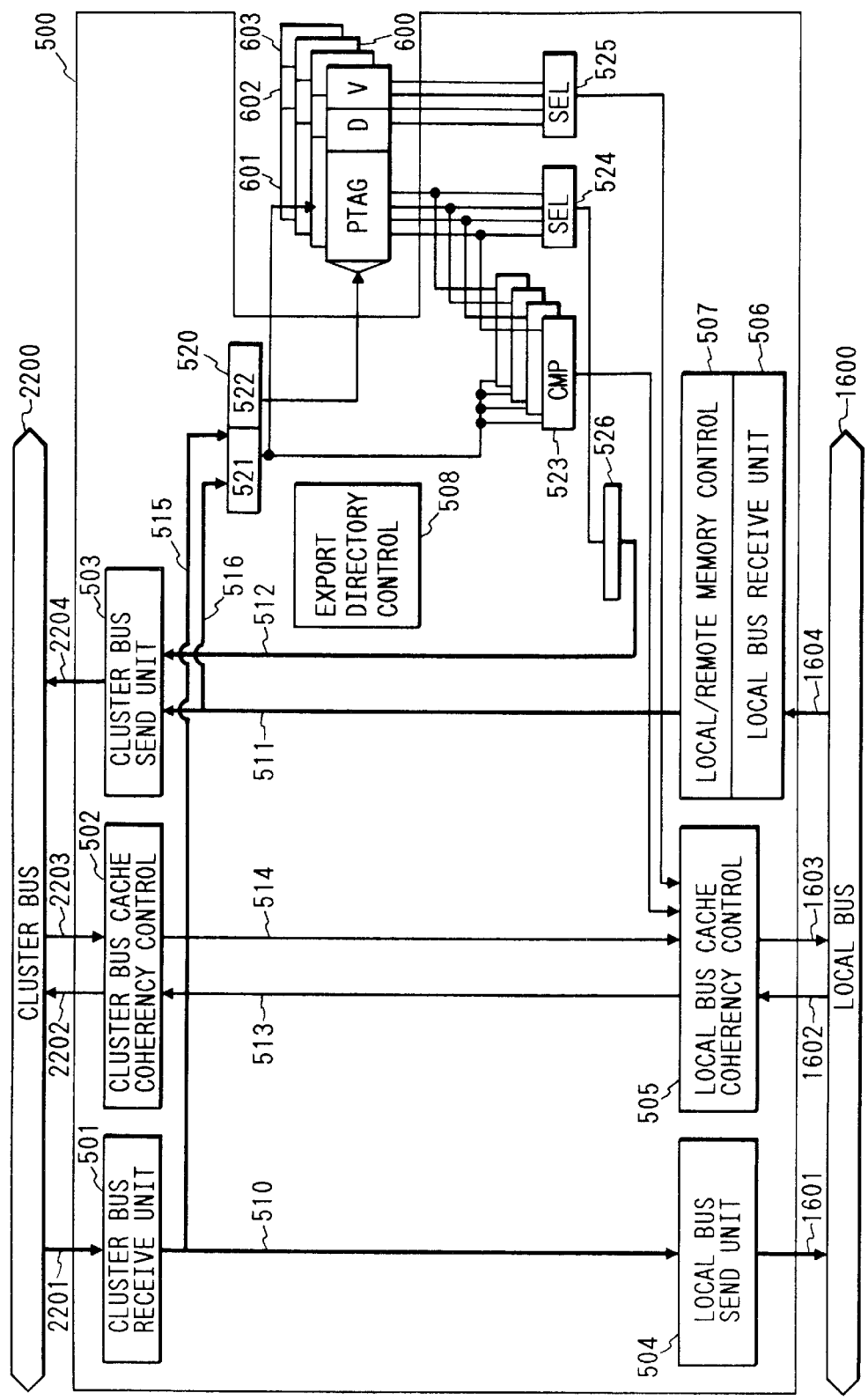

MULTIPROCESSOR SYSTEM HAVING CONTROLLER FOR CONTROLLING THE NUMBER OF PROCESSORS FOR WHICH CACHE COHERENCY MUST BE GUARANTEED

This application is a continuation application of Ser. No. 08/214,764, filed Mar. 18, 1994, now abandoned.

BACKGROUND OF THE INVENTION

The present invention relates to an improved high performance multiprocessor computer system, and more particularly to a cache memory coherency control for distributed cache memories to be used therein.

There is significant ongoing research and development on scalable shared-memory multiprocessor systems capable of efficiently operating a plurality of processors in the order of tens to several thousands of units. Many of these systems adopt a so-called Non-Uniform Memory Access Architecture (NUMA) which has a distributed memory system configuration. That is, when a single memory is shared by several thousand processors in a system, the system cannot achieve its utmost performance due to a bottleneck likely to arise in concurrent accessing of the shared memory. The NUMA architecture is intended to solve such a problem by distributing the shared memory.

On the other hand, along with a current technical trend for the operating frequencies in processors to increase, access latency in accessing a main memory has become an important factor in determining system performance. To improve the latency, it is preferred for the main memory to be provided in the vicinity of the processors. In this respect also, a distributed memory system configuration (NUMA) having a local memory for each processor is preferable. According to such system configuration, there is room for further significant improvement in latency, since the operating frequency of local memories can be increased with an increase in operating frequencies in the processors. Typical examples of such distributed memory systems are listed below.

(1) DASH System at Stanford University: Daniel Lenoski, et. al., "The DASH Prototype: Implementation and Performance", Proc. 19th Int. Symp. on Computer Architecture, 1992. (2) SCI (Scalable Coherent Interface): David B. Gustavson, "The Scalable Coherent Interface and Related Standards Projects", IEEE MICRO, pp.10–22, 1992. (3) IBM RP3 (Research Parallel Processor) The IBM Research Parallel Processor Prototype (RP3): Introduction and Architecture", Proc. of the 1985 Int. Conf. on Parallel Processing, pp.764–771, 1985.

As an important problem to be solved in any distributed memory system, there is the problem of cache memory coherency control which must be implemented for respective cache memories distributed in several thousand processors. This mechanism is necessitated to maintain cache coherency among the contents of cached data in respective cache memories in respective processors.

Conventionally, in the case of a multiprocessor system consisting of several processors, a cache coherence protocol system, which is referred to as the bus snooping system, is generally adopted. This system, in which each processor is coupled to a shared bus, implements its cache coherence scheme by monitoring transactions on the shared bus. Namely, when a particular processor wishes to read particular data, it broadcasts the address of its data to the shared bus. Any of the other processors, which are snooping transactions on the shared bus, when it finds an updated version of the desired data in its own cache memory, transfers said associated data to the requesting processor.

However, when this bus-snooping system is applied directly to any shared memory multiprocessor system having as many as several thousand unit processors, the following problems may occur. A first problem is that it takes too much time from the broadcasting, of the data address to the several thousand processors until the reception of reports from all of the processors reporting each cache coherency. Thereby, in consequence, there occurs an associated problem that even if an access latency in an access to a local memory is reduced by the distributed memory configuration, a delay in cache coherency prevents an instant utilization of the data. Further, a second problem is that the load on the shared bus becomes excessively great. Namely, every time a processor reads or writes data from and to memory, a broadcasting is issued to every other processor. As a result, there occurs too many transactions to be executed on the shared bus when viewed in respect of the overall system. In addition, the frequency of cache coherence procedures by a shared-bus snooping unit in each processor increases thereby resulting in a bottleneck, resulting in a problem that the shared bus system cannot achieve its utmost performance.

As prior art cache coherency protocol methods to solve such problems as described above, there are known two approaches: the directory-based protocol approach and the software-controlled protocol approach. In the directory-based protocol approach, each distributed memory has a directory which keeps track of the cached data for all of the caches in the system. Use of this directory eliminates the used to provide for means for broadcasting to all of the processors or to the bus-snooping mechanism.

With respect to the directory-based protocol approach, there are two approaches, such as the mapping protocol approach and the distributed link protocol approach.

By way of example, the foregoing DASH system adopts a mapping protocol approach. The directory for the mapping protocol approach consists of a cache presence bit which indicates cache memories which have a copy of shared data. Thus, the presence bit needs to have the same number of bits as the number of cache memories provided in the system. As modifications of this mapping method, there are also known a limit mapping method and a group mapping method. The limit mapping method is one which can reduce the number of bits required for indicating the cache presence, by limiting the number of cache memories which are allowed to have a copy of data on the shared memory. Further, in the group mapping protocol method, a group including several processors is defined as a unit for setting a cache presence bit, thereby decreasing the number of bits required for the cache presence bit. In each group thereof, it is possible to implement cache coherence by means of the bus snooping protocol. The above-mentioned DASH system adopts, in practice, the group mapping protocol method.

The distributed link protocol which is one of the directory-based protocols has been adopted by the aforementioned SCI system. The distributed link protocol is a method for providing each data on a shared memory and cache memories with link information, and a linked list is formed by linking every copied data in cache memories and a shared memory. For example, if a particular processor issues a request to delete a copy of particular data from a shared memory on its associated cache, the cache coherence control traces down the corresponding link information for the shared memory data until it finds an initial copy thereof to delete it. When the initial copy has further link information, a subsequent copy thereof can be traced down via the link information then to be deleted. According to this method, the directory information can be decreased advantageously in comparison with the mapping protocol method.

Another important cache coherence protocol system, which is different from the directory-based protocol, is a software controlled protocol system, which is adopted by the above-mentioned IBM RP3 system. The software controlled protocol system is provided with functions capable of assigning attributes distinguishing between cachable and non-cachable data items per a unit of pages, for example, per 4K bytes, as well as of invalidating a particular cache memory entry from the user's program. For example, a local data item characteristic to a particular task is assigned with a cachable attribute, while a data item which is shared between tasks is designated with a noncachable attribute. Then, when a task is transferred from one processor currently at work to another, the local data cached in the cache memory of the one processor is completely invalidated. Thereby, since it is insured that no copy of the local data thereof is present in the other cache memories, there is no need for a cache coherence protocol mechanism to be installed. In addition, since no copy of shared data is cached on other caches, there is no need of the cache coherence protocol itself. Further, according to another example, it may be conceived that, among data which needs to be shared between tasks, shared data for read-only is given a cachable attribute. It will be also possible to provide the whole of a shared data item to be shared between tasks with a cachable attribute. In respect of this case, it is limited to one task that is permitted to access the shared data by using a flag or semaphore. Any task, upon modification of its shared data, before clearing its flag or semaphore, must reflect the contents of the modification onto the main memory by means of a cache invalidate function. According to the software controlled protocol method described above, it is possible to provide a scalable shared memory multiprocessor which does not require hardware for implementing a cache coherence protocol mechanism, such as the bus-snooping mechanism or the directory-based mechanism.

1. Problems Associated with the Tapping Directory Protocol

One of the problems associated with the mapping protocol, which is one of the prior used directory-based protocol systems, is that the size of a directory tends to become excessively large, thus requiring a substantial time to read information from the directory. For example, presuming a system configuration in which a group of processors including 32 units are operating on shared memory with 512 Mbytes, and 32 bytes make up one block which is managed by the directory, the size of a directory will become 512 M bytes/32 bytes×32 bits=64 M bytes. Even if it is so arranged by the group mapping protocol method that four units of processors are grouped into one group, the size of its directory will be 16 M bytes. Further, there occur such problems that if the caches are implemented with DRAMs, the latency of access becomes large, and if they are implemented with SRAMs, the manufacturing thereof becomes costlier. As the latency of accessing the directory increases, the delay in the cache coherence protocol increases, thus failing to achieve any significant movement in latency of a shared memory.

2. Problems Associated with the Distributed Link Protocol

Problems associated with the distributed link protocol, which is another example of the prior used directory-based protocol systems, are that the size of its directory tends to become large, and further, since the distributed link protocol carries out its cache coherence procedure by tracing down associated link information, the delay in the cache coherence protocol tends to increase. In respect of the size of the directory information, in a system in accordance with the above example, it becomes 512 Mbytes/32 bytes×5 bits=10 Mbytes. Even through it has a smaller capacity in comparison with that in the mapping protocol, it still needs to be implemented with DRAM technology, thereby resulting in an increased access time. Another problem ascribed to the link information will be described by way of example as follows. Presume that a particular processor issues a request to invalidate each copy of shared data cached in other cache memories in order to update its own cache memory. At this time, the cache coherence protocol function first reads out link information of corresponding data in the shared memory; then, in accordance with its contents, it invalidates associated entries on other cache memories. This process must be repeated as long as the associated link exists. Thereby, there arises a problem that it takes a significant time until all of the copies in respective caches are invalidated.

3. Problems Associated with the Software Controlled Protocol

Problems associated with the prior art software controlled protocol are that such advantages in the shared data accessing to be implemented by cache memories cannot be expected, thereby resulting in deteriorated access latency, since, in this method, no copies of shared data are cachable in the cache memories, and traffic concentration on the shared bus cannot be alleviated. Further, according to such a protocol method, whereby a copy of the shared data can be registered in a cache memory by software, it is required for the programmer to be always conscious of the cache coherency protocol, thus imposing an excessive burden on the programmer.

SUMMARY OF THE INVENTION

The main object of the present invention is to provide a cache coherence protocol system which is capable of executing cache coherency protocol transactions at a high speed and with minimized interprocessor communications quantities for a large scale multiprocessor system, and processors suitable therefor.

A first measure to solve the above-mentioned problems according to the present invention will be described in the following. According to the invention, there is proposed a multi processor system architecture comprising a plurality of clusters, a bus for interconnecting said plurality of clusters, a global shared memory, and a system control unit for controlling access from any processor in said plurality of clusters to the global shared memory, each one of said plurality of clusters comprising at least two processors, each having a cache memory and a translation lookaside buffer, a local shared memory, and a memory interface unit which is coupled to said at least two processors and the local shared memory and controls access from said at least two processors to the local shared memory, wherein said translation lookaside buffer holds area limit attribute information which helps identify whether a cache coherence control is to be executed only for cache memories in one of said plurality of clusters or for every one of the cache memories throughout the system in response to an access request from any one of the processors.

Further, it is arranged according to the present invention that, for every access from any processor, there is provided area limit attribute information to be retained in its translation lookaside buffer, which helps identify whether a cache coherency protocol should be executed for every one of the cache memories in the system or only for such cache memories as are provided in a limited area of the clusters. Further, there are provided in the memory interface unit thereof cache consistency area determination means for determining a cache consistency area in dependence on the area attribute information retained in the address translation lookaside buffer, and broadcast means for broadcasting information to be utilized in cache coherence protocol to the associated processors within an area specified in accordance with a determination by the cache coherency area determination means. More specifically, the cache coherency area determination means of the invention is provided with a cluster number register for storing information indicative of the identification number of its own cluster, and a comparator for comparing the information retained in the cluster number register and a real address, translated from a virtual address, which was an access address, from any one of the processors, and wherein a limited area requiring a cache coherency protocol is determined in dependence on the result of comparison by the comparator and the area limit attribute information stored in the translation lookaside buffer.

Still further, it is arranged according to the present invention that a processor comprises an instruction cache memory for retaining a portion of instructions stored in a main memory, a data cache memory for retaining a portion of data stored in the main memory, an instruction fetch unit for fetching an instruction to be executed from the instruction cache memory or the main memory, an instruction execution unit which interprets the instruction fetched by the instruction fetch unit and then reads out data from the data cache memory or the main memory accordingly to execute the instruction thus interpreted, and a translation lookaside buffer for translating a virtual address issued from the instruction fetch unit or the instruction execution unit into a real address, wherein a plurality of processors as indicated above are interconnected together to constitute a computer system wherein area attribute information which defines a limited area of a plurality of cache memories for the plurality of processors for which cache coherency must be executed is retained in each translation lookaside buffer.

A second measure to solve the above-mentioned problems according to the invention will be described in the following. It is proposed in order to accomplish the second measure of the invention that a large scale multiprocessor system be divided into a plurality of clusters, each of which consists of a group including a plurality of processors and a main memory, and that each cluster includes an export directory. An export directory which is provided in each cluster is a setassociative directory which registers therein an identifier of any data in a particular cluster to which it is assigned, when copies of that data are cached in cache memories in an external cluster. In this architecture, each cluster includes at least one processor and at least one main memory therein. Cache memory consistency in processors for each cluster is maintained through a cache coherency protocol, such as bus-snoop or the like. Each entry of the export directory holds a physical address of the data, whose copy is cached in the clusters remote therefrom, and a status bit indicative of its status. The status bit represents either one of the three statuses of "shared", "dirty" and "invalid". The shared status represents that a corresponding data has its copies cached in an external cluster(s) but with no modification being applied. The dirty status represents that a corresponding data has its copies cached in an external cluster(s) with modification being entered in the contents of its data, while the invalid status indicates that a corresponding entry is invalid.

Further, overflow control means provided for the export directory has a function to invalidate a corresponding data from every one of the cache memories in the system corresponding to an entry in the export directory, which is purged out when there occurs an overflow in said export directory.

The operation of the above-mentioned first measure of the invention will be described in the following. When any processor issues a memory access request, a virtual address of the memory being addressed is translated into a real address by the translation lookaside buffer. At this time, in reference to particular area attribute information retained in the translation lookaside buffer which helps identify an area which requires cache coherency, a pertinent area for which cache coherence protocol is to be executed is determined for this memory access request.

Further, in the memory interface unit of the invention, the cache coherency area determination means determines an appropriate extent of the area for executing cache coherency in dependence on the area limit attribute information held in the translation lookaside buffer and a real address (memory address) which has been translated by the translation lookaside buffer. Subsequently, pertinent information to be utilized in cache coherence procedures is broadcast by broadcast means only to such processors which are directly involved in a limited area determined by the cache coherency area determination means.

Thereby, it becomes possible to define a cache coherence area which can be limited in accordance with various characteristics of data, such as whether it is local data, shared data, a stack region, etc. In particular, in a very large scale multiprocessor system, since a cache coherence area can be limited as indicated above, it is no longer necessary for every one of the caches.in the system to be addressed to ensure cache consistency, thus resulting in a substantial improvement in latency in the cache coherence protocol. In addition, since it is limited only to such processors within the limited area that the information to be utilized in cache coherency is broadcast, it becomes no longer necessary for every one of the processors in the system to be addressed through broadcasting for every occasion of a memory read/write, thereby substantially reducing the amount of processor-to-processor communications.

Further, in a processor system interconnecting a plurality of processors, wherein each processor comprises an instruction cache memory, a data cache memory, an instruction fetch unit for fetching an instruction to be executed from this instruction cache memory or the main memory, an instruction execution unit which by interpreting the fetched instruction fetched by the instruction fetch unit reads out corresponding data from the data cache memory or the main memory in order to execute a thusly interpreted instruction, and a translation lookaside buffer for translating a virtual address issued from the instruction fetch unit or the instruction execution unit into a real address, since it is arranged that area attribute information which defines an appropriate area for a plurality of cache memories present in the plurality of processors for which cache coherency must be maintained is retained in each translation lookaside buffer, it becomes possible to limit the appropriate extent of the area for which cache coherency is to be maintained in dependence on the various characteristics of data, thereby providing a processor suitable for use in a multiprocessor system interconnecting a plurality of such processors.

The operation of the above-mentioned second measure of the invention will be described in the following. When there occurs a read access to the main memory in a given cluster from outside thereof, the address of subject data is registered in the export directory of the given cluster. On this occasion, the status of entry registered therein is determined by the types of access from outside the given cluster. Namely, when it is intended for use as a reference only, it will be registered in a shared state, and when it is a data read for updating, it will be registered in a dirty state. A corresponding entry in the export directory is invalidated when data exported outside its cluster is invalidated, or when the corresponding data is written back to its home cluster upon being purged out of the cache memories.

When a given processor issues a memory access request, a cache coherency transaction is executed within a given cluster which contains the given processor.. At the same time, in this event, an export directory within the given cluster is searched to verify whether or not any copy of the subject data is cached in cache memories in the other clusters outside the given cluster. When it is verified as a result of the search that no copy of the subject data is cached outside its cluster, cache coherency to be maintained is required only within its cluster. On the other hand, when a copy of the subject data is verified to have been cached outside its cluster and its status bit indicates a necessity of cache coherency, its memory address is broadcast to every one of the clusters to execute cache coherency procedures therein. As a result of such cache coherency procedures, if it is required, an inter-cluster cache-to-cache data transfer will be executed.

When the export directory overflows, the address of any entry which was purged therefrom is sent to the overflow control means described above. Then, the overflow control means broadcasts the address thereof to every one of the clusters so as to invalidate the copies of the corresponding data.

By adopting such an arrangement of the invention, it becomes possible to limit an area for which cache coherency is required in dependence on information stored in the export directory. In particular, in any large scaled multiprocessor system, if a cache coherency area can be limited, there will be no need any more for every one of the caches in the system to be addressed to maintain cache coherency except for those within such a limited area, thereby latency in the cache coherency control will be greatly improved. Further, since it is no longer required to broadcast to every one of the processors within the system for every occasion of an access of a memory read/write, the amount of communication between processors can be reduced substantially.

BRIEF DESCRIPTION OF THE DRAWINGS

The invention disclosed herein will be understood better with reference to the following drawings of which:

FIG. 6 is a chart showing access types according to the invention;

FIG. 16 is a schematic diagram of an internal configuration of a cluster communication control unit of the invention.

PREFERRED EMBODIMENTS

Figure 1:
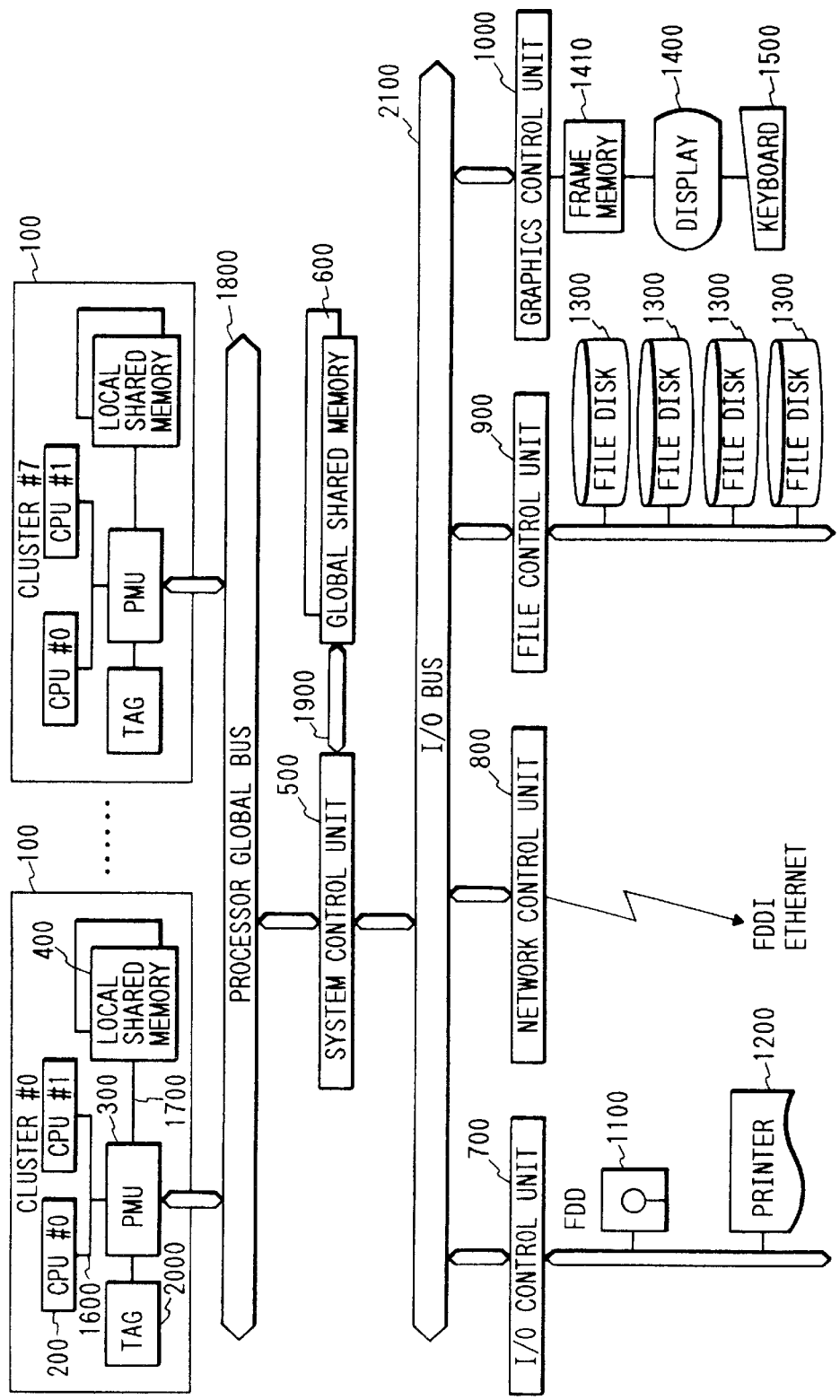
FIG. 1 illustrates a schematic block diagram of a multiprocessor system of one embodiment of the invention.

A first preferred embodiment of the invention will be described in detail in the following with reference to the accompanying drawings. FIG. 1 is a schematic block diagram illustrating the system architecture of a multiprocessor system according to the present invention. In this architecture, a plurality of processors 200 are coupled to a processor memory interface unit 300 via a processor local bus 1600. A local shared memory 400 is coupled to the processor memory interface unit 300 via a local shared memory bus 1700. Further, as means for facilitating a high-speed cache coherence, a cache memory duplicate tag 2000 is also connected to the processor memory interface unit 300. This tag 2000 helps identify the presence of a particular data item cached in respective cache memories provided in the plurality of processors 200.

These plurality of processors 200, the processor memory interface unit 300, the local shared memory 400 and the duplicate tag 2000 constitute a group which is referred to as a cluster 100. A plurality of clusters 100 are coupled to a system control unit 500 via a processor global bus 1800. The system control unit 500 is connected to a global shared memory 600 via a global shared memory bus 1900. Further, the system control unit 500 is also connected via an input/output bus 2100 to an input/output control unit 700, a network control unit 800, a file control unit 900, and a graphics control unit 1000, respectively. The file control unit 900 controls data transfer between a stationary disk unit(s) and the local shared memory 400 or global shared memory 600. The network control unit 800 controls data transfer between an external network, such as an FDDI or Ethernet, and the local shared memory 400 or global shared memory 600. The graphics control unit 1000 controls data transfer between a display frame memory 1410 and the local shared memory 400 or global shared memory 600. Transferred data is displayed on a display unit 1400 through the graphics control unit 1000. Further, the I/O control unit 700 controls data transfer between a floppy disk unit 1100 or a printer unit 1200 and the local shared memory 400 or the global shared memory 600. Each of these I/O control units has a Direct Memory Access (DMA) function. By means of this DMA function, each I/O unit is capable of transferring data between itself and the local shared memory 400 or global shared memory 600 without imposing an extra load on a processor 200.

When there occurs an access from any processor 200 to any memory space or I/O space, it is accepted first by an associated processor memory interface unit 300. The processor memory interface unit 300 identifies an access destination from the address of the access received. When the access is to a local shared memory 400 within the cluster to which the requesting processor belongs, a write/read of data from and to the local shared memory 400 is executed. When the access request from the processor 200 is to a local shared memory 400 in another cluster remote therefrom, the access request is transferred to the associated processor memory interface 300 in the remote cluster via the processor global bus 1800. The processor memory interface 300 in the remote cluster executes a write/read of data to and from its local shared memory 400 responsive to the transferred access request. On the other hand, when the access request from the processor 200 is to the global shared memory 600 or I/O unit, which access will be referred to as a processor direct I/O access hereinafter, the access request will be transferred to the system control unit 500 via the processor global bus 1800.

Figure 14:
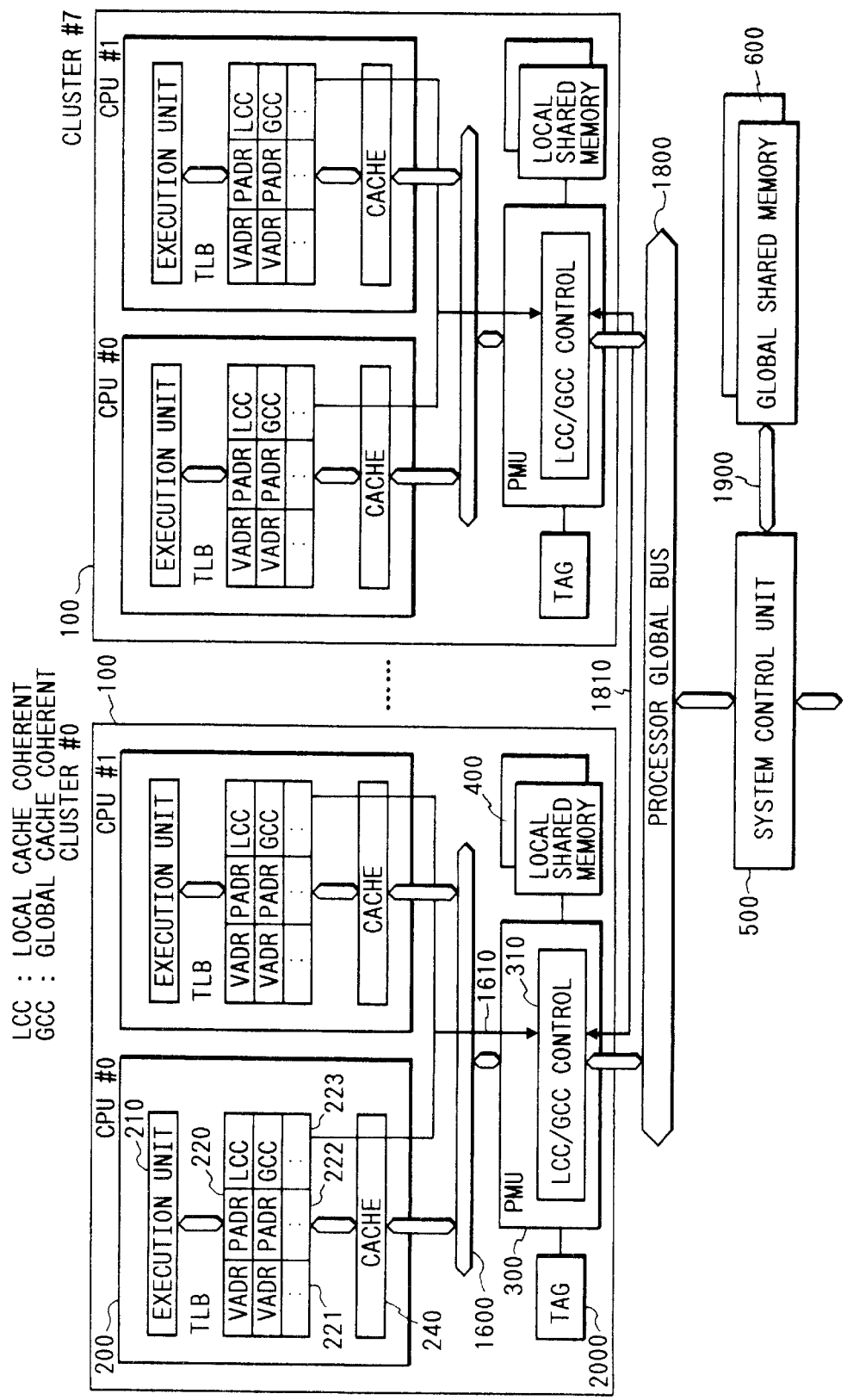
FIG. 14 is a schematic diagram showing, in part, in the vicinities of processors, local shared memories and the global shared memory of the invention.

The system control unit 500 identifies an access destination from the address of the access received from the processor global bus 1800. When it is an access to the global shared memory 600, a write/read of data to and from the global shared memory 600 is executed. When it is an access to the I/O space, the system control unit issues an access request to the I/O bus 2100. Each unit, such as the I/O unit 700, 800, 900 and 1000, receives an access request on the I/O bus 2100 and verifies whether or not it is an access to its own unit from the address thereof. If it is an access request to its own unit, it executes a requested processing, such as register setting, control of I/O units,. etc. By way of example, reference may be made to FIG. 14, which is a schematic block diagram illustrating characteristic portions of one embodiment of the invention, in particular, with respect to processors 200, local shared memories 440, the global shared memory 600 and their peripheral portions.

Figure 2:
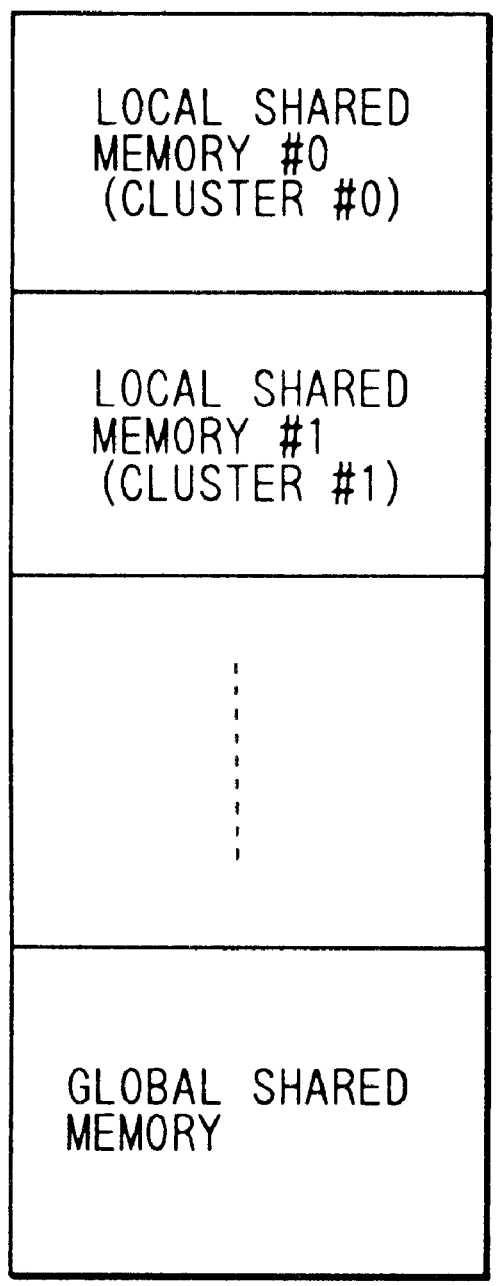
FIG. 2 is a diagram showing address allocations in the physical address space viewed from a processor of the invention.

FIG. 2 shows an example of physical address space allocations for local shared memories 400 and the global shared memory 600 viewed from the processor 200. Sequential addresses are assigned to each local shared memory 400 in each cluster 100, and finally to the global shared memory 600 in the address space. Thereby, it is possible for any processor 200 to access any one of the memories. However, it should be understood, although it is not limited to the address allocation shown here, that any other allocation or modification thereof can be adopted. For example, there may be a memory allocation based on an interleave operation running on a unit of data, for example, of 32 bytes, by assuming that the local shared memory in each cluster 100 operates as a bank. Information on physical memory space allocation, such as described above, is set in a register within the processor memory interface 300 in each cluster 100.

Figure 3:
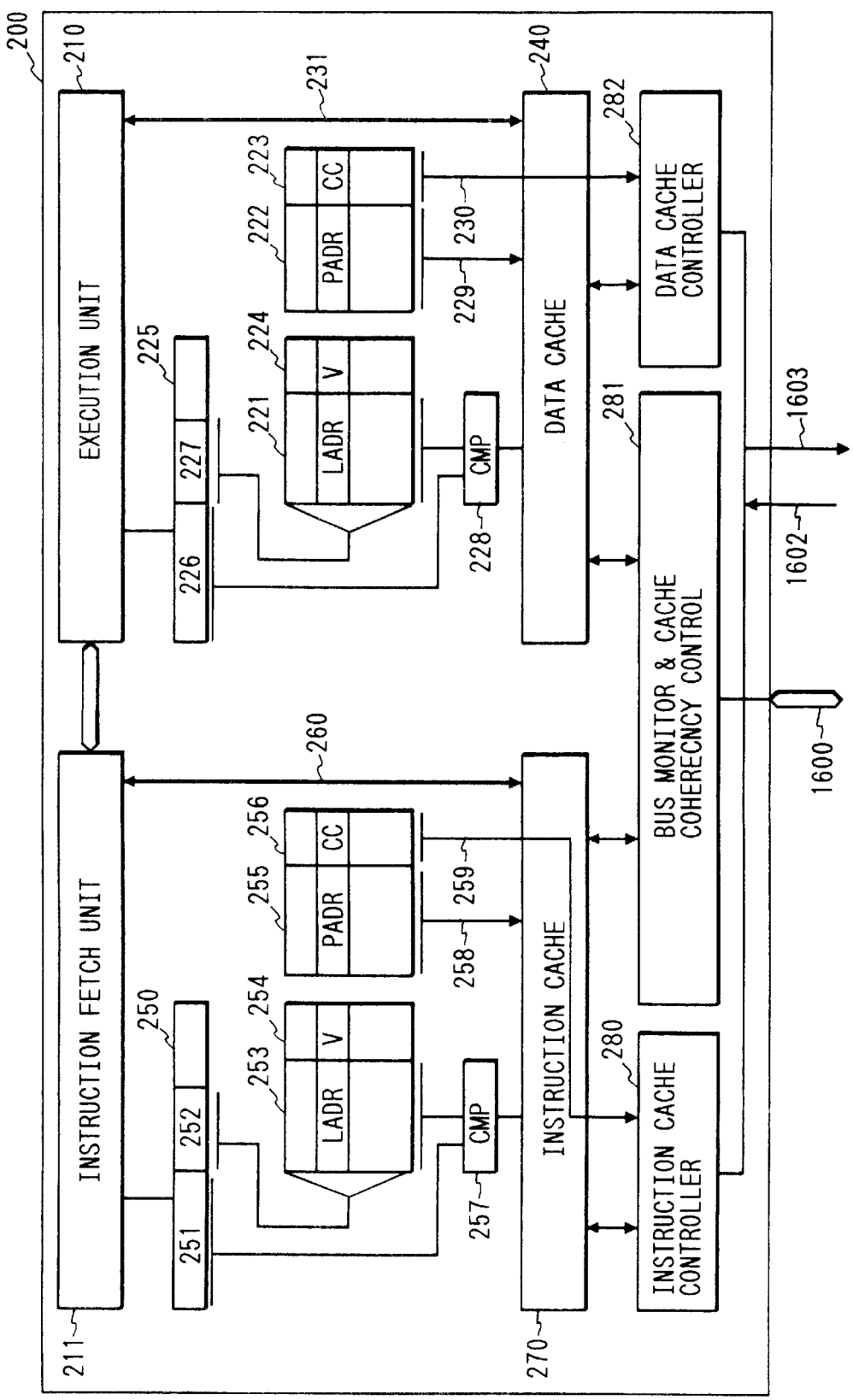
FIG. 3 is a schematic block diagram of an internal configuration of a processor embodying the invention.

FIG. 3 illustrates schematically the internal configuration within the processor 200 of the invention. An instruction fetch unit 211 reads out an instruction needed for execution of a program from a local shared memory 400 or the global shared memory 600. The instruction read out is transferred to an instruction execution unit 210. The instruction execution unit 210 interprets the meaning of the instruction, reads out data needed for execution of the thusly interpreted instruction from the shared memories 400, 600, and then executes an arithmetic operation. Instruction address translation lookaside buffers 253, 254, 255, 256, and data address translation lookaside buffers 221, 224, 222, 223 are provided for implementing a virtual memory system of the invention. Each of them converts a virtual address that the instruction fetch unit 211 and the instruction execution unit 210 issue when they read data from the shared memories 400, 600, into a real shared memory address, which will be referred to as a real address hereinafter.

The instruction translation lookaside buffers comprise a virtual address page: number portion 253, a valid flag portion 254 indicative of whether the virtual address page number 253 is valid or invalid, a real address page number portion 255 corresponding to the virtual address number 253, and cache coherency protocol area attribute information 256, which defines an extent of cache coherency area. In this embodiment of the invention, the cache coherency protocol area attribute information 256 defines two attributes which indicate whether it is a local cache coherency (LCC) which requires cache coherency only within a local cluster or it is a global cache coherency (GCC) which requires cache coherency to be maintained for every one of the cache memories throughout the system. It should be understood that the invention is not limited thereto, and that some other cache coherency area limiting methods can be also conceived within the scope and spirit of the present invention. For example, it is possible to retain a particular group number for which cache coherence should be insured as the cache coherency protocol area attribute information 256.

When the instruction fetch unit 211 issues a virtual address 250, part of the address is utilized as an index address 252 to read out instruction address translation lookaside buffers 253, 254, 255, 256. The virtual address page number portion 253 is compared with an upper address 251 of the virtual address 250 in a comparator 257. When these addresses coincide with each other and its valid flag portion 254 is valid, it confirms a success of address translation, and the hit condition is indicated to an instruction cache memory 270. The real address page number portion 255 obtained as a result of the address translation is utilized as an access address by the instruction cache memory 270.

On the other hand, the cache coherency protocol area attribute information 256 is transferred to an instruction cache control unit 280 for use in limiting the area where cache coherence protocol is required. Data address translation lookaside buffers 221, 224, 222, 223 also have functions almost equal to those of the instruction address translation lookaside buffers, thereby, a detailed description thereof will be omitted.

The instruction cache memory 270 is a high-speed memory which holds a copy of part of the instructions stored in the shared memories 400, 600. If a particular instruction requested by the instruction fetch unit 211 exists in the instruction cache memory 270, the particular instruction can be read instantly without accessing the shared memories 400, 600. If the particular instruction requested does not exist in the cache memory, the instruction cache memory 270 requests corresponding data via an instruction cache controller 280 to the shared memories 400, 600.

The instruction cache controller 280 receives an access to the shared memories from the instruction cache memory 270, then transfers the access via a processor local bus 1600 to the processor memory interface 300. At this time, associated cache coherency protocol area attribute information 256 is also transferred simultaneously. When the processor memory interface 300 returns response data, it is registered in the instruction cache memory 270. At this time, in dependence on cache register attribute information 1602 attached to the response data, when it is an uncachable attribute, the response data is not registered in the instruction cache memory 270, but is transferred to the instruction fetch unit 211.

The data cache memory 240 is a high-speed memory which holds part of the data stored in the shared memories 400, 600. If corresponding data that the instruction execution unit 210 requests exists in the data cache memory 240, the corresponding data can be provided instantly without accessing the shared memories 400, 600. When the corresponding data is not present in the cache memory, the data cache memory 240 issues a request for the corresponding data via a data cache controller 282 to the shared memories 400, 600. Data transfer between the data cache memory 240 and the shared memories 400, 600 is normally done with a data block of about 32 to 128 bytes as a transfer data unit in order to improve the overall hit rate in the data cache memory.

The data cache memory 240 according to the present invention employs a store-in protocol for facilitating a high-speed main memory write processing from the instruction execution unit 210. According.to the store in cache procedure, if target data to write in exists in the data cache memory 240, and if no copy of the target data is present in other cache memories, write in is done only to this data cache memory, without writing to the shared memories 400, 600. A data block in the data cache which was written in is called a dirty block. The dirty block will be written back into the shared memories 400, 600 when the data cache memory 240 is filled up. The instruction execution unit 210 can execute an instruction to forcibly write back an arbitrary dirty block from the data cache memory 240 to the shared memory. The dirty block purged out of the data cache memory 240 is transferred via the data cache controller 282 to the processor local bus 1600. Further description of the data cache controller 282 will be omitted since its function is almost identical with that of the instruction cache controller 280.

The bus monitor & cache coherency controller 281 is a mechanism to maintain cache coherency among processors. When a transaction which necessitates cache coherency protocol is issued on the processor local bus 1600, the bus monitor & cache coherency controller 281 accepts this transaction, then searches the data cache memory 240 and the instruction cache memory 270 to determine if there exists any data block corresponding thereto, or if any, whether the data block corresponding thereto is a dirty block or not. Further, if required, it transfers the corresponding dirty block to the access requester.

Figure 4:
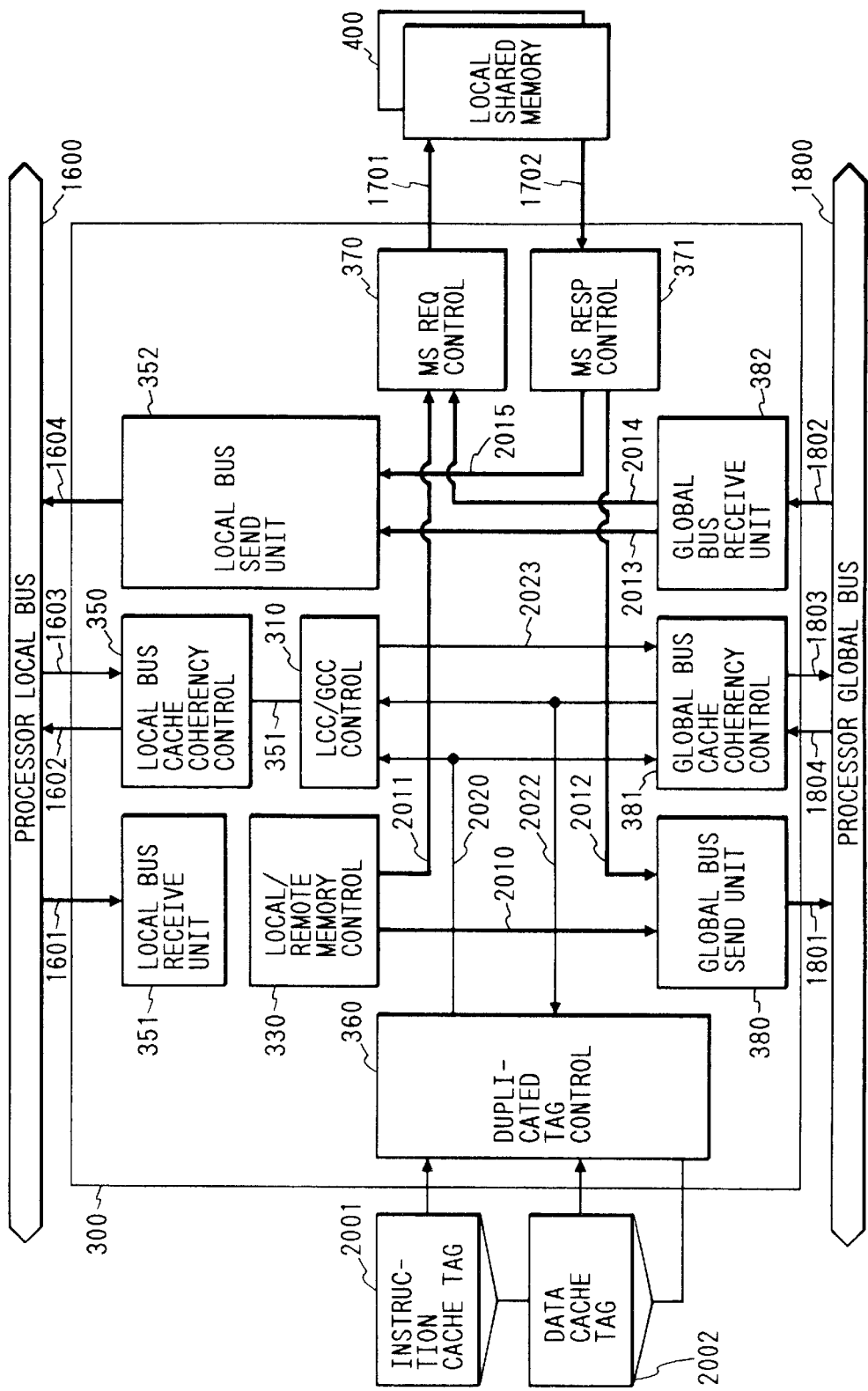
FIG. 4 is a schematic block diagram of an internal configuration of a processor memory interface unit embodying the invention.

FIG. 4 shows schematically the internal configuration of the processor memory interface unit 300 of the invention. A processor local bus receive unit 351 controls reception of an access request from a processor 200. A local/remote memory control 330 determines from the address of the access request received from the processor local bus receive unit 351 whether the request is addressed to the local shared memory 400 within the same cluster, an external local shared memory in a remote cluster, or the global shared memory 600. When it is an access to the local shared memory 400 within the same cluster, the access request is transferred via a bus 2011 to a local shared memory request control 370. Further, when the access request is addressed to an external local shared memory in a remote cluster or to the global shared memory 600, the access request is transferred via a bus 2010 to a global bus send unit 380. A processor local bus send unit 352 receives data which was read out from the local shared memory 400 and sent via a local shared memory response control 371 and a bus 2015, and transfers the data via the processor local bus 1600 to the requesting processor. Further, the local bus send unit 352 receives data read out from the local shared memory in a remote cluster or from the global shared memory 600, which was sent from a global bus receive unit 382 via a bus 2013, and transfers the data received to the requesting processor via the processor local bus 1600.

A local bus cache coherency control 350 has a function to monitor the results of cache coherency transactions executed for built-in cache memories 240, 270 in the processors in the local cluster. When a transaction which requires cache coherency protocol is issued on the processor local bus 1600, a cache memory coherence monitoring is started. It summarizes the results of verification of cache coherencies reported from all of the processors connected to the processor local bus 1600, and reports it by a signal 351 to a local/global cache coherency control 310.

The local/global cache coherency control 310 has four functions. Namely, a cache coherency area determination function, an area limiting broadcasting function, a data supplier select function, and a caching control function. The cache coherency area determination function determines from the cache coherence area attribute information 1603 received from the processor local bus 1600 and the information from the access destination whether cache coherency is required only within the local cluster or it must be maintained among all of the cache memories throughout the system. A simplest area judgment algorithm will be limited to such a case where its cache coherency area attribute denotes a local cache coherency and its access destination is to the local shared memory 400 within the same cluster, whereby the cache coherency is completed only within the local cluster. For any request other than the above simplest algorithm, the above system will perform cache coherency protocol for every one of the caches throughout the system. Further, the area limiting broadcasting function which broadcasts in accordance with the result of judgement by the cache coherence area determination function will not broadcast outside of its local cluster, when the cache coherency is judged to be limitable only within its local cluster. Further, in such a case where every cache memory is an object of cache coherency protocol, a transaction for maintaining cache coherency among every one of the cache memories is issued to the processor global bus 1800 via the bus 2010 and the global bus send unit 380. The data supplier select function, when cache coherency may be limited within its own local cluster, waits for an outcome from the local bus cache coherency control 350, then determines whether to perform a cache-to-cache data transfer or to read out from the local shared memory 400. On the other hand, when every cache memory is an object of cache coherency, it is determined, upon reporting of the results of cache coherency from every one of the clusters connected to the processor global bus 1800, and from the local bus cache coherency control 350, whether to perform a cache-to-cache data transfer or to read out the data from the shared memories 400, 600.

The caching control function determines in accordance with the result of judgment by the cache coherence area determination function and the access address whether or not response data is cachable in the cache memory, and then transfers the response data together with caching attribute information 1602 to the requesting processor. A simplest caching algorithm permitting data caching into cache memories is limited to such a case where its cache coherence area attribute indicates a local cache coherency, and its access address is to a local shared memory 400 within the local cluster, or where the cache coherence area attribute indicates a global cache coherency. Any other cases other than the above, namely, when the cache coherence area attribute indicates a local cache coherency and the access destination thereof is to outside of the local cluster thereof, caching into cache memories is inhibited.

The global bus receive unit 382 receives a local shared memory access requested from other clusters, and transfers the access via a bus 2014 to the local shared memory request control 370. Further, it receives response data in response to the memory read-out request issued from its cluster to other clusters, and transfers the response data via a bus 2013 to the processor local bus send unit 352. The global bus send unit 380 receives the access which is judged in the local/remote memory control 330, to be addressed to outside of its cluster, and then transmits it to the processor global bus 1800. The global bus send unit 380 also receives response data via a bus 2012 from the local shared memory response control 371, and transmits the data to a requesting cluster.

The global bus cache coherency control and monitor 381 is enabled when any one of the processors 200 in the local cluster issues to outside of the local cluster an access request necessitating cache coherency, and monitors the results of cache coherencies transferred from the other clusters. Then, it summarizes the results of the cache coherencies transferred from all of the other clusters and reports the summary to the local/global cache coherency control 310. Another function of the global bus cache coherency control and monitor 381 is to perform an inter-cluster cache coherency transaction to maintain data consistency between respective clusters. When any transaction necessitating cache coherency is issued on the processor global bus 1800, the global bus cache coherency control and monitor 381 accepts this transaction there into. Then, it transfers this accepted transaction via a bus 2022 to a duplicated tag control 360. The duplicated tag control 360 searches through a data cache duplicated tag memory 2002 and an instruction cache duplicated tag memory 2001 for any associated tag coincidence, and judges whether or not any corresponding data block exists in the local cluster, and whether the corresponding data block, if any, is a dirty block or not. The global bus cache coherency control and monitor 381 receives the result of judgment from the duplicated tag control 360, and then reports via the processor global bus 1800 the result of judgment to the cluster which issued the access request. When there exists a dirty block in the cluster, it is requested, via the local shared bus send unit 352 to a processor in the local cluster which holds a copy of the corresponding dirty block, that the processor transfer its corresponding data to the access requester.

Figure 5:
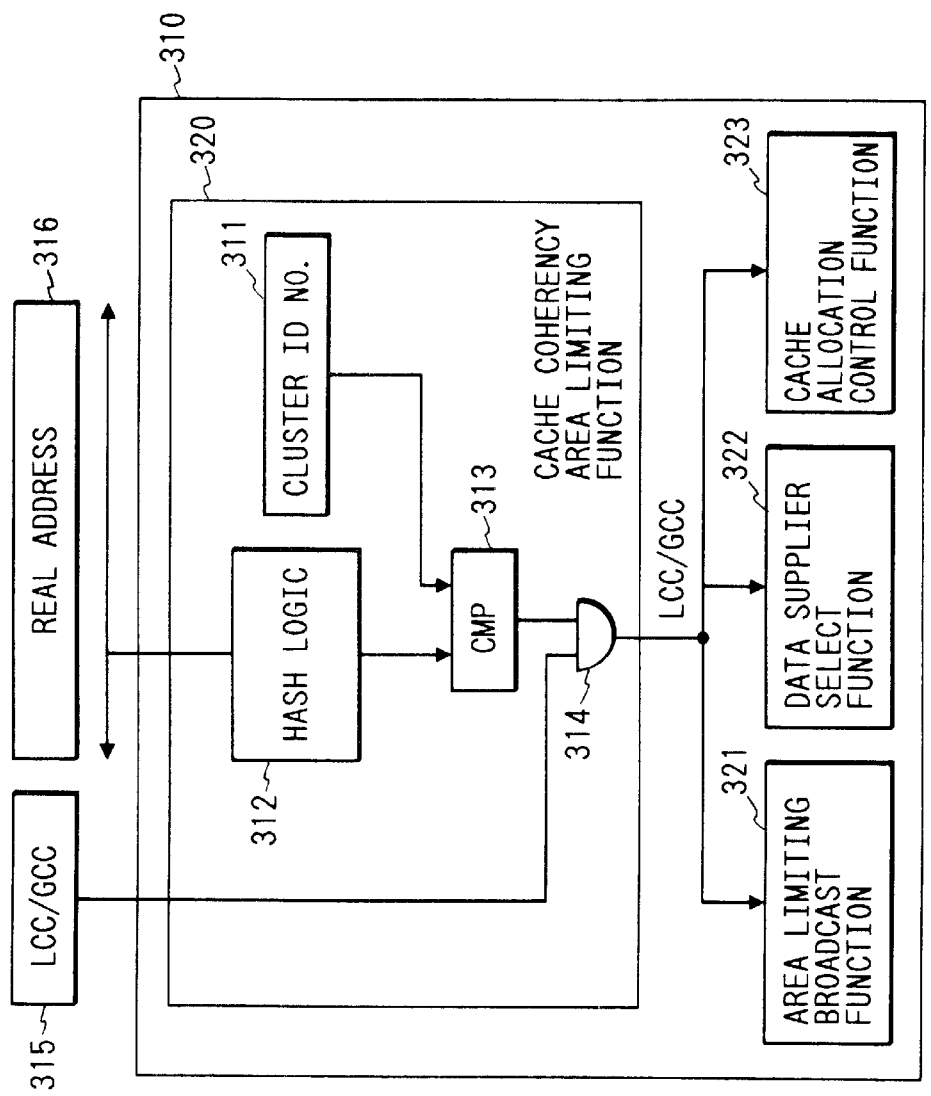
FIG. 5 is a schematic diagram of an internal arrangement of a local/global cache coherence control unit embodying the invention.

FIG. 5 illustrates in more detail an internal configuration of the local/global cache coherency control 310 of the invention. Its main components comprising four parts include a cache coherence area limiting function 320, an area limiting broadcast function 321, a data supplier select function 322, and a caching control function 323. Inside the cache coherency area limiting function 320, there is provided a cluster identification number register 311 which designates its local cluster number. On the basis of a real address 316 received from the processor local bus, and by comparing information derived through Hash logic and the cluster identification number register 311 in a comparator 313, it is judged whether the real address 316 is to be sent to the local shared memory 400 in the local cluster or to that in a remote cluster, or to the global shared memory. By way of example, the simplest Hash logic may be implemented such that a portion of an upper address of the real address 316 is cut out so as to be compared with the cluster ID number register 311. For example, presuming an ID number 0 cluster has a local memory of 256 Mbytes, then real addresses from 0x00000000 to 0x0FFFFFFF may be allocated for the accesses to the local memory when it is an access target within the ID number 0 cluster, with any other addresses exceeding the above extent being allocated for an access to an external memory when it is an access target outside the local cluster. However, it should be construed that the Hash logic 312 is not limited to such an implementation, but must take a variety of variations thereof in accordance, with how its shared memory address allocation is implemented. The result of judgment on the access target defines a cache coherency area, as well as the cache coherency area attribute information 315 of an access target page received from the processor 200. Namely, when the access object is within the local cluster, and cache coherency area attribute information designates a local cache coherency (LCC), cache coherency area is limited to within the local cluster. On the other hand, when the access object is outside the local cluster and its cache coherency area attribute information designates a local cache coherency (LCC), or when its cache coherency area attribute information designates a global cache coherency (GCC), the cache coherency area is caused to include the remote clusters.

According to this embodiment of the present invention, five types of memory accesses as listed in FIG. 6 may occur. Such an event permitting cache coherency to be maintained only within the local cluster is limited to such a case where the access target is the local shared memory within the local cluster, and its page cache coherency attribute information indicates a local cache coherency (LCC). Any other types of memory accesses other than the above necessitate cache coherency to be maintained among every one of the cache memories in the system. Further, memory accesses inhibiting caching in cache memories include a memory access wherein the access target is a local shared memory in a remote cluster, and its page cache coherency attribute indicates a local cache coherency attribute (LCC). Namely, an access from outside the area wherein cache coherency is maintained cannot be cached in cache memories.

Figure 7:
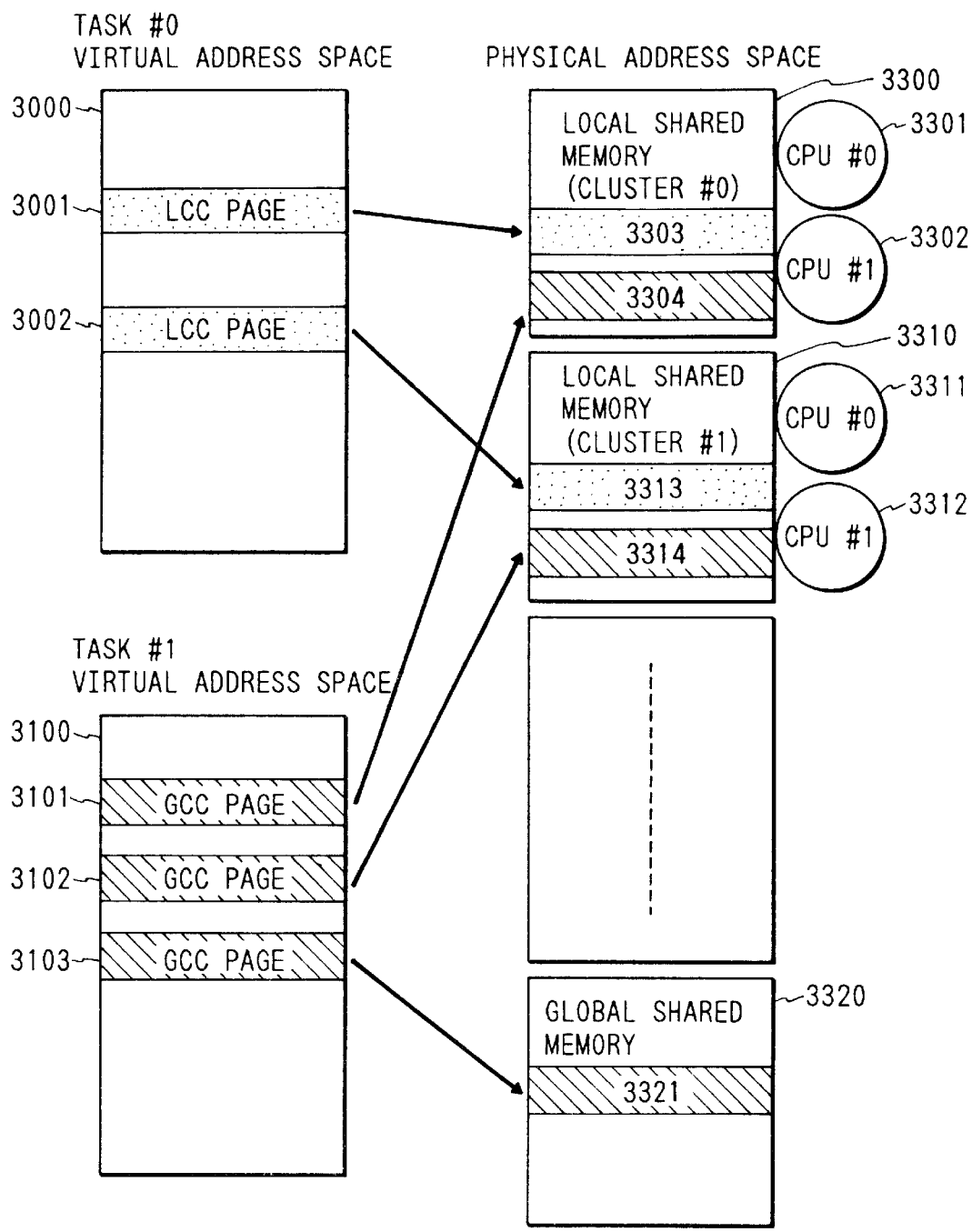
FIG. 7 is a diagram of an example of memory allocations, and task allocation according to the invention.

FIG. 7 illustrates examples of memory accesses in accordance with the five types as described above. Numeral 3000 designates a virtual address space for a task 0, and 3100 designates a virtual address space for a task 1. Further, 3300 designates a physical address space for a local shared memory in the cluster 0, 3310 designates a real address space for a local shared memory in the cluster 1, and 3320 designates a physical address space in the global shared memory. Further, processors 3301, 3302 represent processors in the cluster 0, while processors 3311, 3312 represent processors in the cluster 1. Mapping information for mapping these virtual address spaces in each task to the physical address spaces is registered in an address translation lookaside map that is controlled by the page allocation function in the operating system. Assume that the task 0 is executed by the processors in the cluster 0, and the task 1 is executed by the processors in the cluster 1. A local cache coherency attribute page 3001 in the task 0 is allocated by address translation to a local shared memory 3303 in the cluster 0, wherein an access to this page is only within the local cluster and the access has a local cache coherency attribute. A local cache coherency attribute page 3002 in the task 0 is allocated by address translation to a local shared memory 3313 in the cluster 1, wherein an access to this page is an access to a remote cluster that is permitted such an access with a local cache coherency attribute. A global cache coherency attribute page 3101 in the task 1 is allocated by address translation to a local shared memory 3304 in the cluster 0, wherein an access to this page is an access to a remote cluster that is permitted such an access with a global cache coherency attribute. A global cache coherency attribute page 3102 in the task 1 is allocated by address translation to a local shared memory 3314 in the cluster 1, wherein an access to this page is permitted within the local cluster which is effected by such an access with a global cache coherency attribute. A global cache coherency attribute page 3103 in the task 1 is allocated by address translation to a global shared memory 3321 wherein an access to this page is an access to the global shared memory which is permitted to such an access with a global cache coherency attribute.

With reference to FIGS. 8 through 13, there are shown memory access process sequences according to the invention.

(1) Block Read Access to the Local Shared Memory in the Local Cluster

Figure 8:
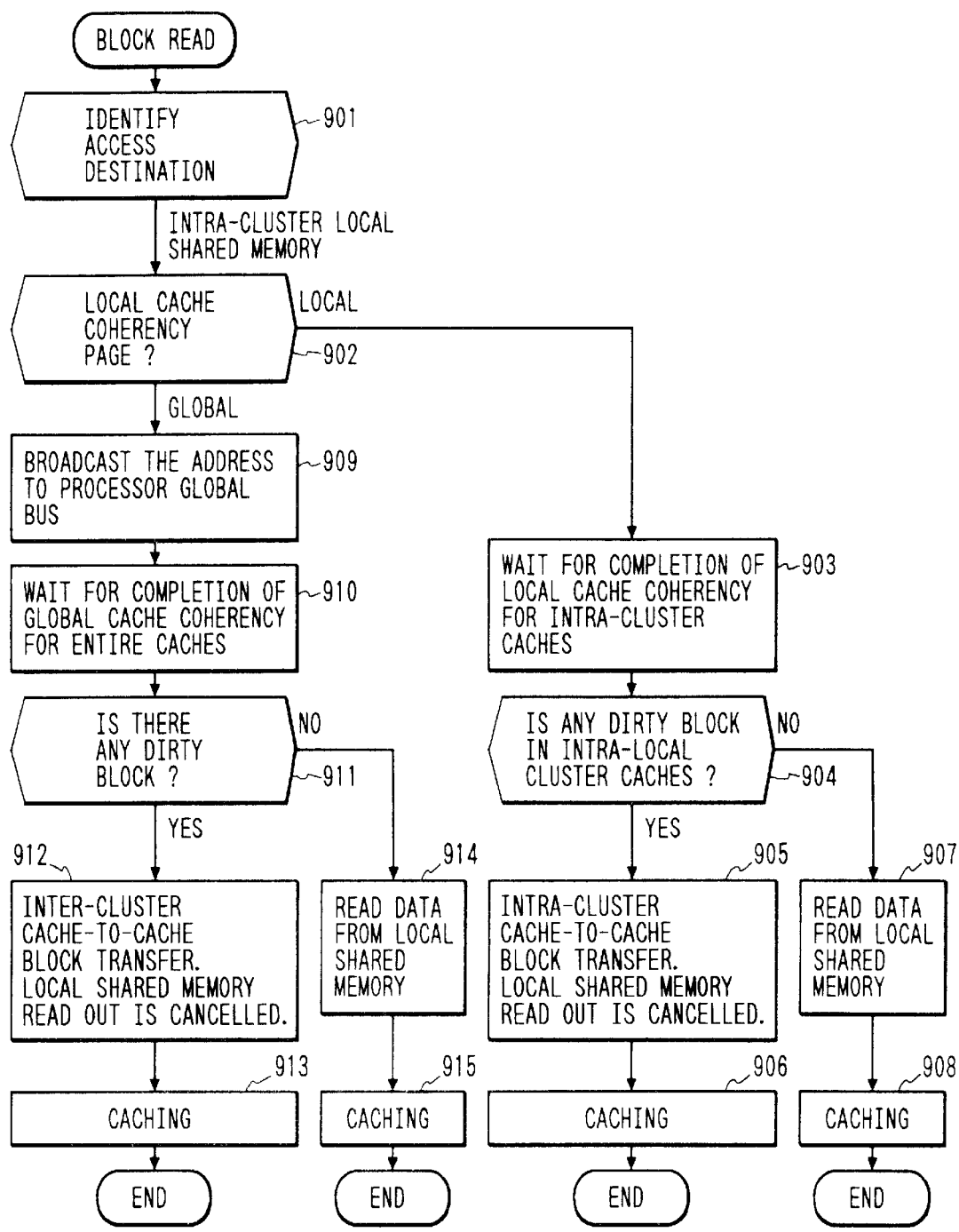
FIG. 8 is a block read processing flowchart for a block read request to the local shared memory in the local cluster.

FIG. 8 shows a process flow for an access to the local shared memory in the local cluster. A block read request issued by a processor 200 is transmitted via the processor local bus 1600 to the processor memory interface unit 300. During this event, other processors in the local cluster start simultaneous monitoring of the block read request and carry out a cache search through their associated caches for any coincidence. The processor memory interface unit 300 identifies an access to the local shared memory within the local cluster from the address of the access received in step 901. Next, in step 902, on the basis of information.on the cache coherence attribute 223 received from the address translation lookaside buffer in the requesting processor 200, it is judged whether or not the requested data is of a local cache coherence attribute data. When it is judged to be a local, the process flow waits until a cache coherence procedure is completed within the local cluster in step 903. Then, in step 904, it is judged whether or not there exists any dirty block in other cache memories within the local cluster. When any dirty block is judged to be present, a cache-to-cache data transfer is executed within the local cluster, thereby cancelling data read from the local shared memory 400 in step 905. Then, the response data transferred is cached in an associated cache memory of the access requester in step 906. Further, when there exists no dirty block, data read out from the local shared memory 400 is transferred to the access issuer in step 909 to be cached in the cache memory thereof in step 908.

On the other hand, when the judgment in step 902 on the local cache coherence attribute indicates a global attribute, the processor memory interface unit 300 broadcasts the memory address thereof to the processor global bus 1800 in step 909. Then, in step 910 the process flow sequence waits until all of the global cache coherence procedures are completed for every one of the clusters. Upon reception of the broadcast address, the other clusters carry out their cache coherence control with respect to the corresponding data by searching its duplicated tag 2000. As a result of their cache coherence control, it is judged whether there exists any dirty block in the other clusters in step 911. If no dirty block exists in the other clusters, relevant data is read out from local shared memory 400 within the local cluster, which is then transferred to the access requester in step 914 to be cached in its associated cache in step 915. If any dirty block exists in any remote clusters, the processor memory interface 300 in a target remote cluster issues a request to the processor 200 having the dirty block to transfer the data by cache-to-cache transfer. The dirty block will thus be transferred between clusters to the requesting cluster. At this time, data-read from the local shared memory 400 in the local cluster is cancelled in step 912. Subsequently, the response data thus transferred will be cached in the cache memory of the access requester in step 913.

(2) Block Read Access to Local Shared Memory in Remote Clusters

Figure 9:
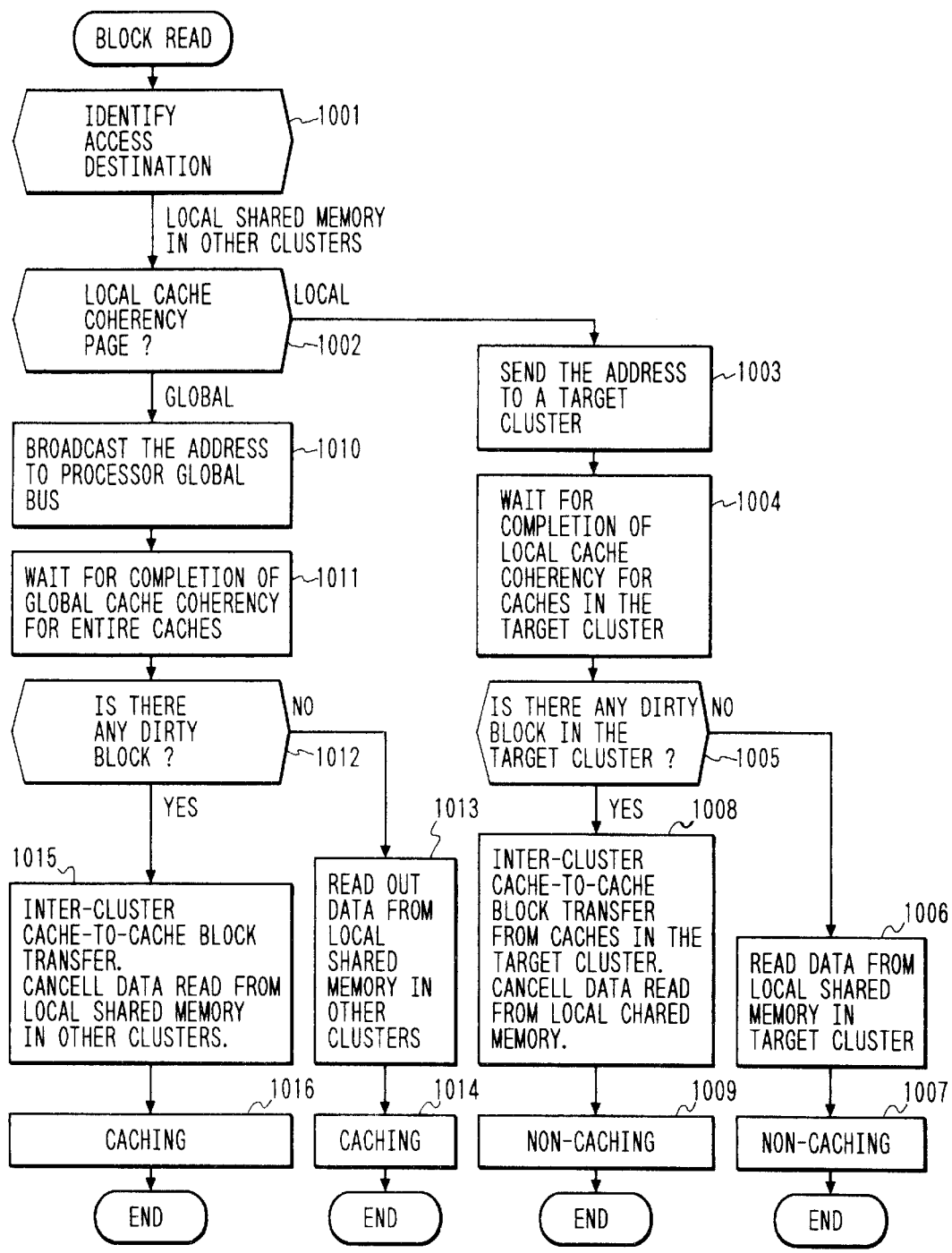
FIG. 9 is a block read processing flowchart for a block read request to a local shared memory in a remote cluster.

With reference to FIG. 9, there is illustrated a process flow diagram for an access to a local shared memory in a remote cluster according to the invention. A block read request issued by the processor 200 is transferred via the processor local bus 1600 to the processor memory interface unit 300. At this time, the other processors within the local cluster concurrently monitor said block read request and execute a cache search through their associated caches. The processor memory interface unit 300 identifies an access to a local shared memory in any remote clusters from the address of the access received in step 1001. Then, it is judged in step 1002 whether the target data is of a local cache coherence attribute or not according to information received from the cache coherence attribute 223 in the address translation lookaside buffer in the processor 200. When it is judged to be the local attribute, the block read request is transferred to a target cluster via the processor global bus 1800 in step 1003. The target cluster, upon accepting the block read request, reads out a target data from its local shared memory and by searching its duplicated tag 2000 executes an intra-cluster cache coherency control for any corresponding data in step 1004. Then, it is judged whether or not there exists a dirty block in the cache memories within the target cluster in step 1005. As a result of such cache coherence procedures, if no dirty block is found to be present, the target data read out from the local shared memory is transferred to the requesting cluster in step 1006, and then the process sequence exits from the routine without caching the data into the cache memory in step 1007. If any dirty block is found to be present in the target cluster, the processor memory interface 300 in the target cluster requests the processor 200 having the dirty block to execute a cache-to-cache data transfer. Thereby, the dirty block is transferred between clusters to the requesting cluster. At this time, data read from the local shared memory 400 within the target cluster is cancelled in step 1008. Then, the process sequence exits from the routine without caching the response data in the cache memories in step 1009.

On the other hand, if an accessed page is of a global cache coherence attribute, at the same time that the block read request is transferred via the processor global bus 1800 to a target cluster(s), its memory address is broadcast to every one of the clusters in step 1010. Then, the process sequence waits until all of the global cache coherence procedures are completed for every clusters in step 1011. When the other clusters in the system receive the broadcast address, they search through the duplicated tag 2000 for any coincidence whereby a cache coherency control of the corresponding data is executed. As a result of the cache coherence control, it is determined whether or not there exists any dirty block in any other clusters in step 1012. If no dirty block is confirmed to be present in any of the other clusters, the target data is read out from the local shared memory 400 within the target cluster and is transferred to the requesting cluster in step 1013, and then the data thusly transferred is cached in the cache memory of the requester in step 1014. If there exists any dirty block in any other cluster, the processor memory interface 300 in that cluster requests the processor 200 having the dirty block to execute a cache-to-cache data transfer. The dirty block is thus transferred by traversing across the clusters to the requesting cluster. At this time, data read from the local shared memory 400 within the target cluster is cancelled in step 1015. Then, the response data thusly transferred is cached in the cache memory of the access requester in step 1016.

(3) Block Read Access to the Global Shared Memory

Figure 10:
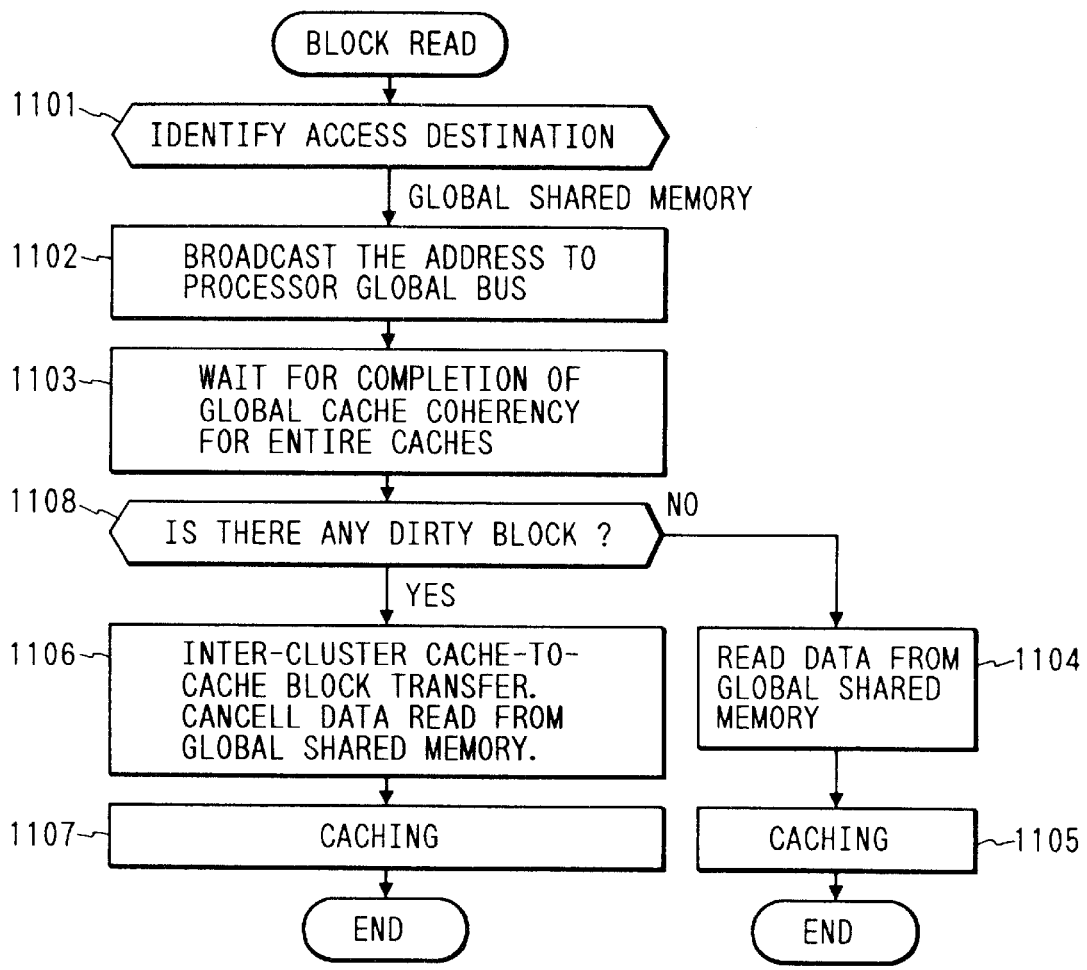
FIG. 10 is a block read processing flowchart for a block read request to a global shared memory.

With reference to FIG. 10, there is illustrated a process flow for an access to the global shared memory 600 according to the invention. A block read request issued by the processor 200 is transmitted via the processor local bus 1600 to the processor memory interface unit 300. Concurrently, the other processors in the local cluster monitor the above block read request, and then carry out a cache search for any coincidence throughout their associated caches. The processor memory interface unit 300 identifies in step 1101 the access to be one addressed to the global shared memory from the address of the access received. Then, it transfers the block read request via the processor global bus 1800 to the system control unit 500, and, at the same time it broadcasts the memory address thereof to all of the other clusters in step 1102. Then, the process sequence is interrupted to wait until all of the global cache coherence procedures are completed among all clusters in step 1103. The other clusters upon reception of the broadcast address carry out a cache coherence control with respect to the corresponding data by searching a duplicated tag 2000. Through such cache coherency control, it is judged whether or not there exists any dirty block in any other of the clusters in step 1108. If there exists no dirty block in any other of the clusters, the system control unit 500 reads out relevant data from the global shared memory 600 and transfers the data to the cluster which contains the access requester in step 1104, and then the data thusly transferred is cached in its associated cache memory in step 1105. When there exists a dirty block in any other of the clusters, the processor memory interface 300 in the other cluster issues a request to the processor 200 having the dirty block to execute a cache-to-cache data transfer. Then, the dirty block is transferred by traversing across the clusters to the cluster which contains the access requester. At this time, data read from the global shared memory 600 is cancelled in step 1106. Then, the response data thusly transferred is cached in the cache memory of the processor of the access requester in step 1107.

(4) Cache Flush Access to Local Shared Memory in the Local Cluster

Figure 11:
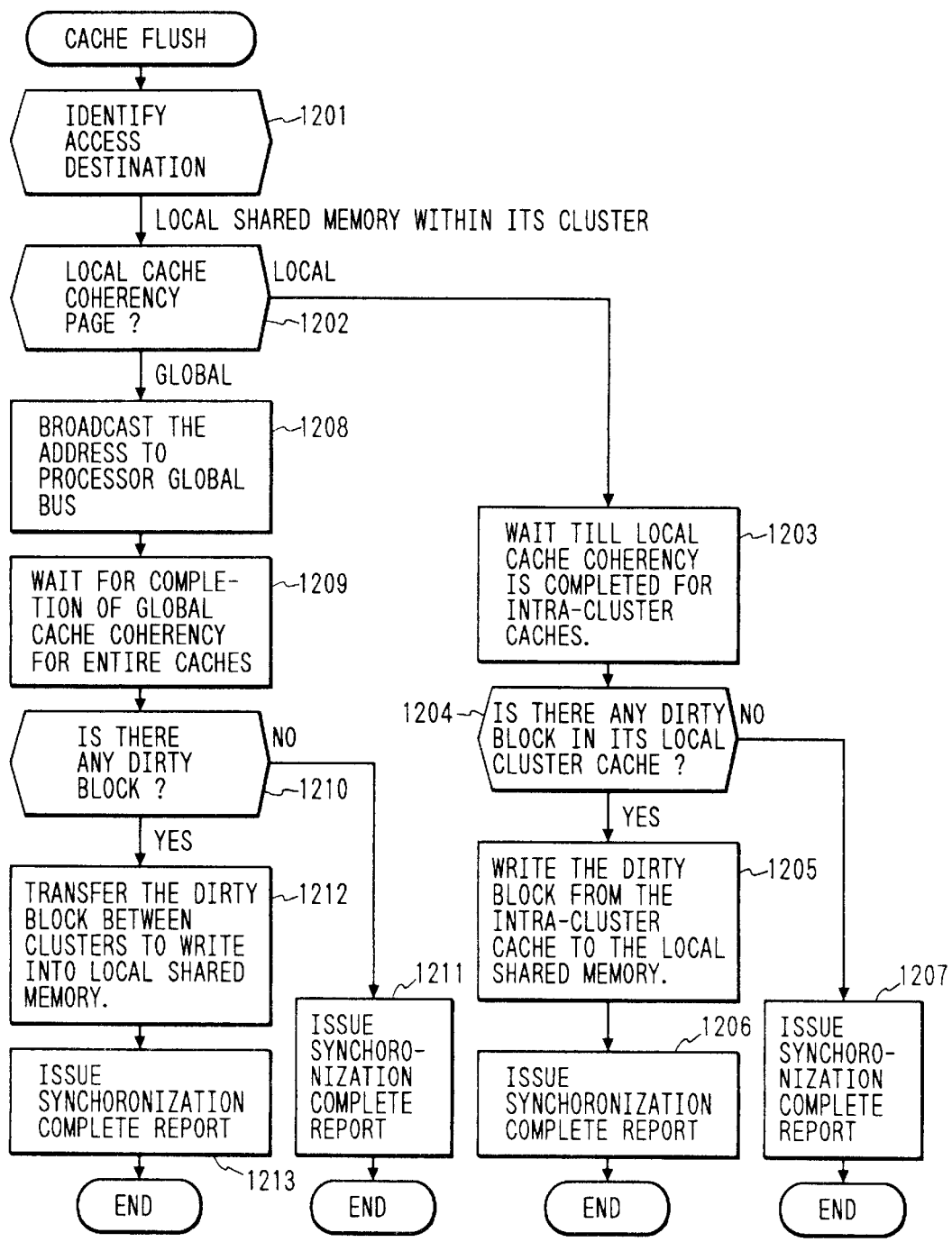
FIG. 11 is a cache flush processing flowchart for a cache flush request to the local shared memory in the local cluster.

With reference to FIG. 11, there is shown a process flow for a cache flush request to the local shared memory in the local cluster according to the invention. A cache flush request issued by the processor 200 is transmitted via the processor local bus 1600 to the processor memory interface unit 300. At this time, other processors in the local cluster monitor concurrently the above cache flush request and carry out a cache search through their associated caches for any coincidence. Further, the processor of the access requester executes a memory synchronization instruction, and waits for a report indicating the completion of the memory synchronization. The processor memory interface unit 300 identifies the access to be destined to the local shared memory in the local cluster from the address of the access received in step 1201. Next, it is judged on the basis of information received from the cache coherence attribute 223 in the address translation lookaside buffer in the processor 200 whether or not the target data is of a local cache coherence attribute in step 1202. If it is of the local attribute, the process sequence waits until an intra-cluster cache coherence procedure is completed in the local cluster in step 1203. As a result of the intra-cluster cache coherence procedure, it is judged whether or not there exists any dirty block in the other cache memories in the same cluster in step 1204. If any dirty block exists in any other of the cache memories in the local cluster, the dirty block is written back in the local cluster in step 1205, and then a memory synchronization when effected is reported to the access requester in step 1206. Further, if no, dirty block exists, the completion of the memory synchronization is reported at once to the access requester, thereby exiting the process flow in step 1207.

On the other hand, if the target data is judged to be a global attribute as a result of judgment of its local cache coherency attribute, the memory address thereof is broadcast to the processor global bus 1800 in step 1208. Then, in step 1209 the process is interrupted to wait until the entire global cache coherency protocol is completed with respect to every one of the clusters. The other clusters, upon receiving the broadcast address, carry out cache coherency control for the target data by searching the duplicated tag 2000 for any coincidence. As a result of such cache coherence control, it is determined whether or not there exists any dirty block in any other of the clusters in step 1210. If it is judged that there exists no dirty block in any other cluster, it is reported at once to the access requester that memory synchronization is completed in step 1211. If a dirty block exists in any other cluster, a processor memory interface unit 300 in the other cluster issues a request to the processor 200 having the dirty block to write back the dirty block. The dirty block is passed across the clusters to the access requester to be written back to the local shared memory thereof in step 1212. Then, memory synchronization is reported to the access requester in step 1213.

(5) Cache Flush Access to Local Shared Memory in Remote Clusters

Figure 12:
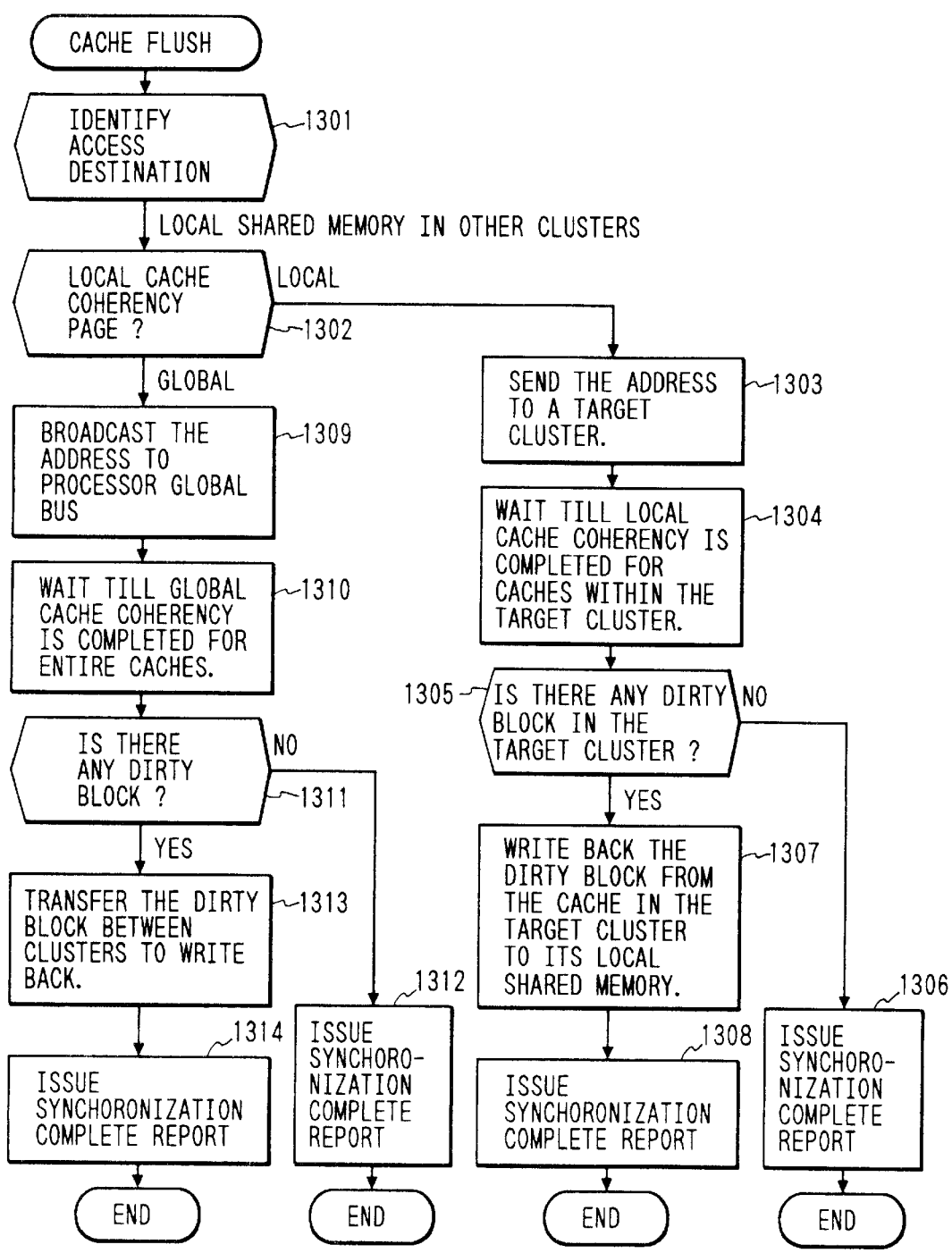
FIG. 12 is a cache flush processing flowchart for a cache flush request to a local shared memory in a remote cluster.

With reference to FIG. 12, there is shown a process flow for a cache flush access to the local shared memory in any other clusters according to the invention. A cache flush request issued from the processor 200 is transmitted via the processor local bus 1600 to its processor memory interface unit 300. On this occasion, the other processors in the local cluster concurrently monitor the above block read request, and carry out a cache search within their associated caches for any coincidence. The processor memory interface unit 300 identifies in step 1301 the access to be one addressed to a local shared memory in a remote cluster from the address of the access received. Next, it is judged from the information on the cache coherence attribute 223 received from the address translation lookaside buffer in the processor 200 whether or not the target data is of a local cache coherence attribute in step 1302. When it is of a local attribute, the cache flush request is transferred via the processor global bus 1800 to a target cluster in step 1303. Upon accepting the cache flush request, the target cluster searches through the duplicated tag 2000 for any coincidence whereby an intra-cluster cache coherency control with respect to the target data is executed in step 1304. As a result of such cache coherency control, it is judged in step 1305 whether or not there exists a dirty block within the target cluster. If no dirty block exists, the process exits the flow upon reporting of the completion of memory synchronization to the access requester in step 1306. If a dirty block exists within the target cluster, the associated processor memory interface 300 requests the processor having the dirty block to write back the dirty block. Thereby, the dirty block is written back to the local shared memory within the target cluster in step 1303. Then, a completion of memory synchronization is reported to the access requester in step 1308.

On the other hand, if an accessed page is of the global cache coherence attribute, the cache flush request is broadcast via the processor global bus 1800 to all of the clusters in the system in step 1309. Then, the process flow is interrupted in step 1310 to wait until the global cache coherence procedures are completed for all of the clusters. Upon receiving the broadcast address, the other clusters carry out their cache coherence control with respect to the target data by searching their duplicated tag 2000. As a result of the cache coherency control, it is judged in step 1311 whether there exists any dirty block in any other cluster. If there exists no dirty block in any other cluster, the completion of memory synchronization is reported at once to the access requester in step 1312. If there exists a dirty block in any of the other clusters, the processor memory interface 300 in the associated cluster requests the processor therein having the dirty block to write back the dirty block. The dirty block is transferred by passing it across the clusters to the target cluster, wherein it is written back to the local shared memory thereof in step 1313. Then, the completion of memory synchronization is reported to the access requester in step 1314.

(6) Cache Flush Access to Global Shared Memory

Figure 13:
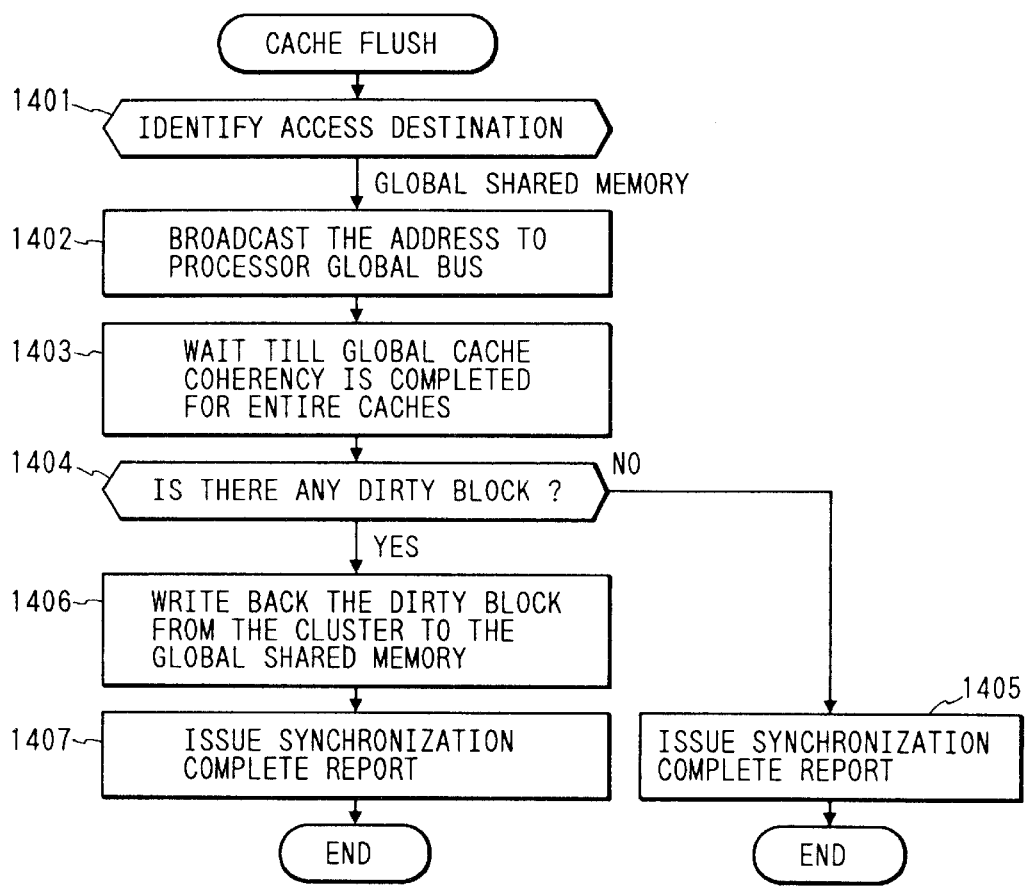
FIG. 13 is a cache flush processing for a cache flush request to the global shared memory.

With reference to FIG. 13, there is shown a process flow for a cache flush access to the global shared memory 600 according to the invention. A cache flush request issued by the processor 200 is transmitted via the processor local bus 1600 to the processor memory interface unit 300. At the same time on this occasion, the other processors in the same cluster monitor the above block read request and carry out respective cache searches within their own caches. The processor memory interface unit 300 identifies in step 1401 that the access is one destined to the global shared memory from the address of the access received. Then, it broadcasts in step 1402 the cache flush request via the processor global bus 1800 to all of the clusters. Then, the process flow waits in step 1403 until the global cache coherency control is completed with respect to all of the clusters. The other clusters in the system, upon receiving the broadcast address, carry out their cache coherence control with respect to the target data by searching their associated duplicated tag 2000. As a result of such cache coherency control, it is determined in step 1404 whether or not there exists any dirty block in any of the other clusters. If no dirty block exists in any of the other clusters, the completion of memory synchronization is reported at once to the processor of the access requester in step 1405. If there exists any dirty block in any other clusters, the processor memory interface 300 in a target cluster requests the processor 200 having the dirty block to write back the dirty block. Accordingly, the dirty block is transferred to the system control unit 500 to be written back to the global shared memory 600 in step 1406. Then, the completion of memory synchronization is reported to the access requester in step 1407.

According to the present invention, the following advantages and effects have been implemented. Firstly, the cache coherence area required for cache data coherency can be limited in accordance with the various characteristics of the data as defined by such factors as whether it is local data, shared data, a stack area or the like, so that there is no need any longer for all of the caches in the system to be subjected to cache coherency protocol, thereby substantially improving latency due to the cache coherency control.

Further, since the cache coherency area can be limited as indicated above, there is no need for broadcasting.to every one of the processors in the system every time there is an execution of a memory read/write operation, so that it becomes possible to substantially reduce the quantities of inter-processor communications.

Furthermore, in comparison with the directory-based protocol which requires a large capacity of 10 to 20 Mbytes, the cache coherence area limiting protocol embodying the present invention is capable of implementing an efficient cache coherency control with reduced resources.

Figure 15:
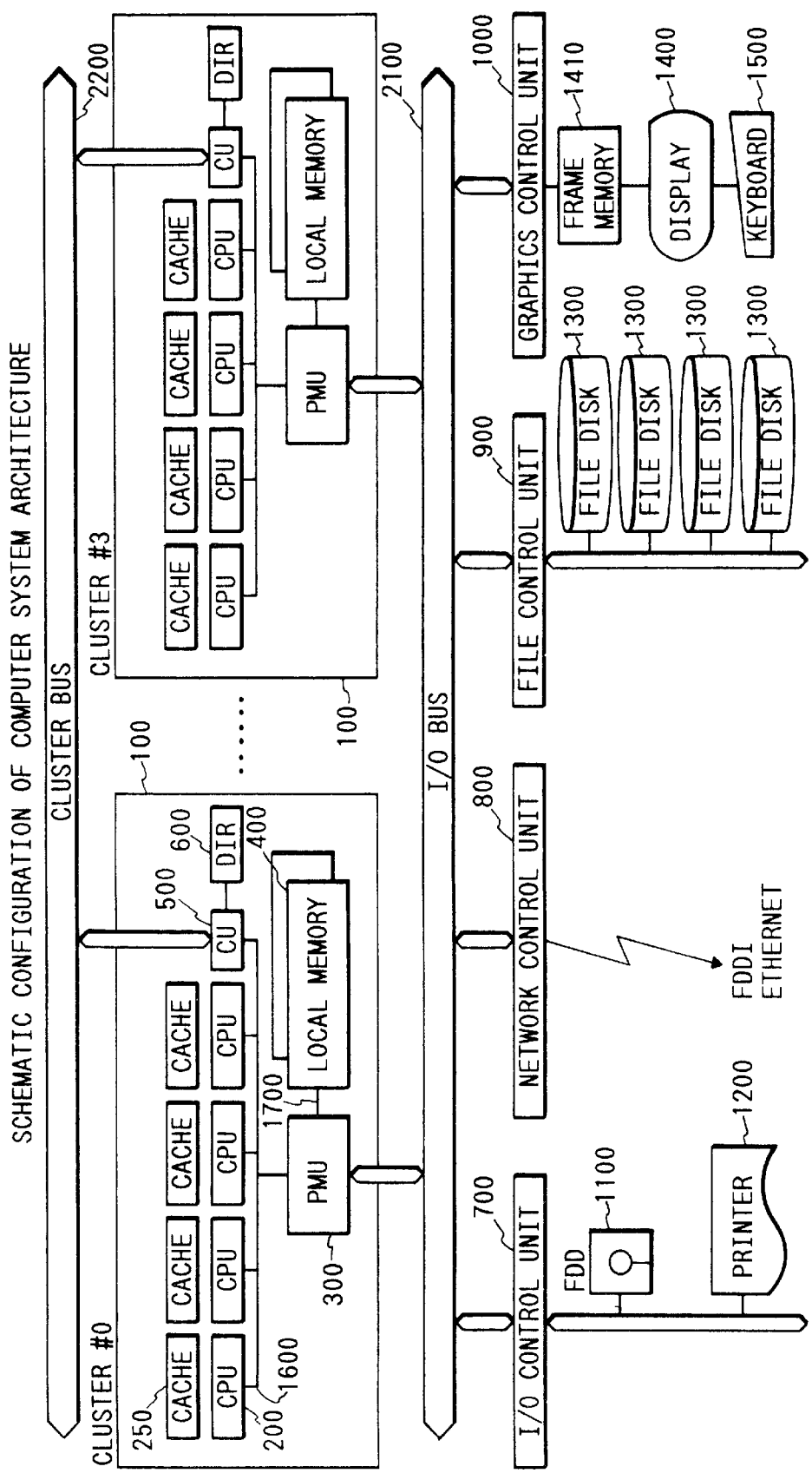
FIG. 15 is a schematic diagram of a computer system of the invention.

Next, a second preferred embodiment of the invention will be set forth in detail with reference to the accompanying drawings. FIG. 15 is a schematic block diagram illustrative of a computer system embodying the invention. According to the second preferred embodiment of the invention, there are provided a plurality of processors 200 each having a cache memory 250, and a processor memory interface unit 300 to which the plurality of processors 200 are coupled via a local bus 1600. Further, there is also provided a cluster communication control unit 500 having an export directory 600 coupled thereto, which is also coupled to the processor memory interface unit 300 via the local bus 1600. To the processor memory interface unit 300, there is coupled a local memory 400 via a local memory bus 1700. An assemblage of these plurality of processors 200, the processor memory interface unit 300, the local memory 400, the cluster communication control unit 500 and the export directory 600 constitutes a unit or group which is referred to as a cluster 100. When a copy of data copied from the local memory 400 in the cluster 100 is cached in an external cache 250 outside the cluster 100, an address of the copy of the data is registered in the export directory 600. Thus, by means of the export directory 600 as indicated above, it becomes possible to readily determine whether or not an extensive cache coherency protocol is required through the entire system, thereby facilitating a high speed cache coherency protocol operation. A plurality of clusters 100 are coupled to a cluster bus 2200 via the cluster communication control unit 500 so as to constitute a large scale multiprocessor system as a whole. Further, the respective clusters 100 are coupled via an input/output bus 2100 to an input/output control unit 700, a network control unit 800, a file control unit 900, and a graphic control unit 1000. Functions of these control units are the same as those set forth with respect to the first embodiment of the invention.

An access request from a processor 200 to a memory space is received through the local bus 1600 by the processor memory interface unit 300 and the cluster communication control unit 500, respectively. The processor memory interface unit 300 and the cluster communication control unit 500 respectively determine an access destination from the address of the access received. If the access is one addressed to the local memory 400 within the same cluster, the processor memory interface unit 300 identifies this, and then executes a data read/write from and to the local memory 400. On the other hand, if the access from the processor 200 is to a local memory 400 in a remote cluster, the cluster communication control unit 500 identifies this, and then transfers the access request via the inter-cluster bus 2200 to a cluster communication unit 500 in the remote cluster. The cluster communication control unit 500 in the remote cluster, upon reception of the transferred access request, transfers this to its processor memory interface unit 300 within the cluster. The processor memory interface unit 300 in the remote cluster executes a read/write of data from and to its local memory 400 in response to the access request.

If the access request from the processor 200 is to the I/O unit, which will be referred to as an I/O direct access by a processor hereinafter, it will be accepted first by the processor memory interface unit 300 through the local bus 1600. The processor memory interface unit 300 examines the address of the access, and, if it is the access to its associated I/O space, it issues an access request onto the I/O bus 2100. Each one of the I/O units 700, 800, 900, 1000 monitors the I/O bus 2100 for the presence of an access request, and then verifies if it is addressed to its own unit or not from the address thereof. If the access request is addressed to its own unit, it performs a required processing, such as register set, control of I/O units and the like, in response to the request.

As an example of appropriate address allocations in the local memory 400 for the entire system in respect of the processor 200, there may be conceived a similar method as in the first embodiment wherein each address for respective local memories 400 of respective clusters 100 is allocated sequentially. Thereby, it becomes possible for a given processor 200 to access to any one of the memories in the system. The address allocations are not limited thereto, but any other modifications thereof within the scope and spirit of the invention may be possible. For example, there may be conceived a memory allocation wherein, by presuming that each local memory in each cluster 100 operates as a bank, an interleave operation per data unit with a certain size data block, for example, of 32 bytes, is possible. Such physical memory space allocation information is set in registers in the processor memory interface 300 and the cluster communication control unit 500 in each cluster 100. Since the internal configurations of the processor 200 and the cache memory 250 are the same as those described in the first embodiment of the invention, further descriptions thereof will be omitted. Now, with respect to the data cache memory in the cache memory 250, a cached data block may have either one of the four statuses of "invalid", "shared", "exclusive", and "dirty". The designation "invalid" denotes an invalid status, and the designation "shared" denotes that there exists a copy of the same block of data in another cache memory. The designation "exclusive" denotes that a target block of data exists exclusively in its local cache alone with no modification of the contents thereof being applied. The designation "dirty" denotes that a target block of data exists exclusively in its local cache alone and with some modifications in the contents thereof being applied. There are provided instructions, such as a cache flush instruction and a cache purge instruction, to operate the data cache memory. When a cache flush instruction is issued, and when its target block is "dirty", the target data corresponding thereto is written back to the main memory to be invalidated thereafter. If it is in a status other than the "dirty" status, invalidation alone is executed. On the other hand, when a cache purge instruction is issued, invalidation will be executed irrespective of the status of the target block.

Since the internal configuration of the processor memory interface unit 300 is approximately similar to that in the processor memory interface unit 300 described in the first embodiment of the invention, any further description thereof will be omitted.

With reference to FIG. 16, there are shown an internal configuration of a cluster communication control unit 500 and a schematic configuration of an, export memory 600 according to the invention. The cluster communication control unit 500, which is coupled to the local bus 1600 and the cluster bus 2200, controls inter-cluster communications between respective clusters 100. A local bus receive unit 506 is responsible for controlling reception of a transaction from the local bus 1600. As transactions to be received there are an access request from a processor 200 within the local cluster and response data from the local memory within the local cluster. When an access request is received from the processor 200, a local/remote memory control unit 507 determines whether the access request is addressed to the local memory 400 within the local cluster or to the local memory in a remote cluster from the address of the access received from the local bus receive unit 506. When it is an access request to the local memory 400 in another cluster, the access request is transferred through a bus 511 to a cluster bus send control unit 503. On the other hand, if the access is a request to its own local memory 400 within the same cluster, no data read processing is executed for reading data from local memories in remote clusters.

A local bus send control unit 504 is responsible for controlling transfer of access requests issued from processors 200 in remote clusters and response data responsive thereto from local memories 400 in remote clusters to the local bus 1600. Further, when any data within its cluster is exported out of its cluster in response to an access from a remote cluster, the address of its target data is registered through a bus 515 into an export directory 600. A local bus cache coherency control unit 505 has a function to monitor the results of cache coherency executed to maintain data consistency among built-in cache memories 250 within the processors 200 in the local cluster 100. The above function is activated when the local bus send control unit 504 issues to the local bus 1600 a transaction necessitating cache coherency in response to an access request from a remote cluster, or when there is issued on the local bus 1600 any transaction necessitating cache coherency.

When the local bus send control unit 504 issues a transaction, the local bus cache coherency control unit 505 receives cache coherency results corresponding thereto executed in other processors within the local cluster through a signal line 1602, and then sends the results to a cluster bus cache coherency control/monitor unit 502. Further, in case there occurs a cache-to-cache data transfer as a result of the cache coherency transaction, target data transferred from a cache memory 250 in another processor 200 is received by the local bus receive control unit 506 and is sent to the cluster bus send control unit 503. On the other hand, when any transaction which requires cache coherency is detected on the local bus 1600, the local bus cache coherency monitor/control unit 505 acknowledges this transaction, and searches via the bus 516 through the export directory 600 for any coincidence to determine whether or not it is necessary to perform cache coherency among clusters. When the cache coherency control required is closed within the local cluster, the result of cache coherency is reported via a signal line 1603 to the local bus 1600. On the other hand, when an inter-cluster cache coherency is required, the cluster bus cache coherency control/monitor unit 502 is activated via the signal line 513.

The cluster bus receive control unit 501 receives an access request from a processor 200 in a remote cluster or response data from a local memory 400 in the remote cluster, and transfers them via the bus 510 to the local bus send control unit 504. The cluster bus send control unit 503 transmits the access request addressed to a remote cluster which has been sent from the local bus receive control unit 506 or exports response data destined to a remote cluster through the cluster bus 2200. The cluster bus ahoy coherency control/monitor unit 502 is enabled when it receives an inter-cluster cache coherency request from the local bus ahoy coherency control unit 505, or when a transaction necessitating cache coherency is issued on the cluster bus 2200. When an inter-cluster ahoy coherency control is requested, a corresponding address of the access is broadcast to the cluster bus 2200, and then completion of cache coherency to maintain data consistency among the every clusters 100 is waited for. Upon completion of the inter-cluster ahoy coherency, the result thereof is received through the signal line 2203, and then it is reported to the local bus ahoy coherency control unit 505. At this time, when an inter-cluster cache-to-cache data transfer is required, it is arranged according to the invention that the cluster bus receive unit 501 accepts target data transferred from the remote cluster to transfer it to the local bus send control unit 504. On the other hand, when a transaction necessitating ahoy coherency is detected.on the cluster bus 2200, this transaction is accepted by the cluster bus receive control unit 501 and then is broadcast through the local bus send control unit 504 to the local bus 1600 in its cluster, whereby a cache coherency protocol is performed throughout the local bus. The result of this cache coherency protocol is received by the local bus cache coherency control unit 505, which reported through the signal line 2202 to the 2200. Next, with reference to FIG. 16, configuration of the export directory 600 invention will be described below. The export directory 600 may comprise a plurality of directory sets which permit parallel search. This embodiment of the invention call for four sets. Each set comprises a plurality of entries which include a physical address portion 601, a dirty bit portion 602, and portion 603. When a copy of a particular data in the local cluster is cached in any cache memory cluster, a corresponding address corresponding particular data is registered in the export directory 600. A read request from other clusters is through the cluster bus receive control unit bus 501 and the bus 515 to an export directory address register to be registered therein. The export directory register 520 includes an index portion 522 comparison tag portion 521. An export directory unit 508 designates an entry to the export by an index portion 522, and registers a comparison 521 in the physical address portion 601. At this time, a dirty bit 602 is determined by transaction. Namely, if a data read transaction received from other clusters is only for reference purposes, the dirty bit 602 becomes off-state, shared state while, if the transaction is intended to apply a modification after read out, the dirty bit becomes on-state, i.e., indicates a dirty state.

When a new entry is in the queue for registration, and if all the entries available for its registration in each set are fully utilized, a least utilized entry therein is purged out. An entry to be purged out is selected by a selector 524, and the address thereof is set in a victim buffer 526. The export directory control unit 508 broadcasts the address of the entry set in the victim buffer 526 through the bus 512 and the cluster bus send control unit 503 to all the clusters in the system so as to invalidate all corresponding date stored therein.

The export directory 600 is utilized when determining whether or not any inter-cluster cache coherency, i.e., cache consistency throughout the system, is necessitated when a transaction requiring cache coherency is issued within the local cluster. In such cases, the transaction issued within the local cluster is snooped by the local bus cache coherency control/monitor unit 505 and the local bus receive control unit 506. The address of the transaction thus snooped is registered in the export directory address register 520 through the buses 511, 516. The export directory control unit 508 designates an entry to be entered into the export directory 600 by the index portion 522, compares a physical address portion 601 read out from respective sets and a comparison tag portion 521 in the export directory address register 520 in a comparator 523, and then sends the result of the comparison to the local bus cache coherency control/ monitor unit 505. When there is a hit or coincidence as the result of comparison, a dirty bit portion 602 of its corresponding entry is selected by the selector 525 to be sent to the local bus cache coherency control/monitor unit 505. Then, the local bus cache coherency control/monitor unit 505 determines whether or not cache coherency should be performed throughout the system as a result of the export directory search.

Next, examples of memory access process sequences of the invention will be described in the following.

(1) Block Read Access to the Local Memory in the Local Cluster

A process flow for a block read access to the local memory 400 in the local cluster will be described in the following. A block read request issued by a processor 200 is broadcast through the local bus 1600 and is transmitted to the processor memory interface unit 300 and the cluster communication control unit 50.0. During this event, the other processors within the local cluster snoop the hereinabove block read request concurrently and execute a cache search within their associated caches in response thereto. The processor memory interface unit 300 and the cluster communication control unit 500 identify if the access is directed to its own local memory 400 within the local cluster from the address of the access they received, and then the processor memory interface unit 300 starts an access to the local memory, while the cluster communication control unit 500 interrupts a read access to remote clusters. At this time, the cluster communication control unit 500 determines whether or not an inter-cluster cache coherency is necessary as a result of search through the export directory 600.

When its comparison results in a miss or a hit in the shared state in the export directory, no intercluster cache coherency is necessary. In such cases, it is judged as a result of an intra-cluster cache coherency whether or not any dirty block exists in the other cache memories therein. When there exists any dirty block, a cache-to-cache data transfer is performed, cancelling a read access to the local memory 400. At this time, the processor memory interface unit 300 accepts the data transferred by cache-to-cache data transfer then writes it back into the local memory 400. Then, the response data is cached at a shared state in the cache memory of the access requester. Further, when there exists no dirty block, relevant data read out from the local memory 400 is transferred to the access requester to be cached in its cache memory. At this time, when it is verified, as a result of the cache coherency protocol that there exists a copy of the target data in the other cache memories, the data is registered at a shared state, and if no copy exists, it is registered at an exclusive state.

On the other hand, an inter-cluster cache coherency protocol becomes necessary when the cluster communication control unit 500 determines, as a result of a search in the export directory 600, that there exists a corresponding entry in the dirty state in the export directory. Then, the cluster communication control unit 500 instructs the local bus to extend its area in which cache coherency is to be executed, and, at the same time, broadcasts the corresponding memory address thereof to the cluster bus 2200 so as to enable an inter-cluster cache coherency protocol. Respective cluster communication units 500 in the other clusters in the system execute snooping of the broadcast corresponding address, and then they broadcast the address thereof to a local bus 1600 in each remote cluster so as to execute each local cache coherency procedure. As a result of such inter-cluster cache coherency protocol, it is determined whether or not any dirty block exists in the other clusters. If there exists no dirty block in the other clusters, relevant data is read from the local memory 400 within the local cluster and is transferred to the access requester. Then, in accordance with the result of the inter-cluster cache coherency procedure, the transferred data is cached in caches in a shared or exclusive state. In case there exists a dirts block in the other clusters its data block is transferred between the cluster communication control units 500 to the cluster of the access requester. Then, the local cache coherency process interrupted in the cluster of the access requester is resumed to transfer the data from the cluster communication unit 500 to the processor of the access requester. At this time, a data read access from its own local shared memory 400 within the local cluster is cancelled. Further, the data for transfer is taken into the processor memory interface unit 300 to write it back to its local memory 400. Furthermore, the state of the corresponding entry in the export directory 600 is changed from the dirty state to a shared state. Then, the response data is cached in the cache memory of the access requester in a shared state.

(2) Block Read Access to the Local Memories in Remote Clusters

A process flow for a block read access to a local memory 400 in remote clusters according to the invention will be described in the following. A block read request issued from a processor 200 is broadcast to the local bus 1600 so as to be transmitted to the processor memory interface unit 300 and the cluster communication control unit 500. During this time, the other processors in the local cluster simultaneously perform snooping of the above block read request, and then carry out a cache search within their associated caches. The processor memory interface unit 300 and the cluster communication control unit 500 respectively identify an access, if it is destined to a local memory 400, in remote clusters from the address of the access received thereat. Then, the processor memory interface unit 300 cancels an access to the local memory on the other hand, the cluster communication control unit 500 instructs, irrespective of what the export directory 600 indicates, that the local bus extend its area of cache coherency processing and that a corresponding memory address of the access be broadcast through the cluster bus 2200 to a target cluster, so as to start an inter-cluster cache coherency protocol concurrently. Respective cluster communication control units 500 in the other clusters carry out snooping of the broadcast address, and then again broadcast the thus snooped address to the local bus 1600 within each cluster so as to start local cache coherency processing therein. At this time, in a target cluster to which the access is destined, an access to read data from its local memory 400 starts. As a result of the above inter-cluster cache coherency protocol, it is determined whether or not there exists any dirty block in any other of the clusters. If any dirty block exists in the any other of the clusters, its data block is transferred across the cluster communication control units 500 to the requesting cluster. At this time, the access to read data from the local memory 400 in the target cluster is cancelled. Further, the cluster communication unit 500 in the target cluster takes in the data to be transferred between the clusters to write it back to the local memory 400 in the target cluster. Still further, the state of the corresponding entry in the export directory 600 in the target cluster is changed from the dirty to a shared state. In parallel with the above transaction, the local cache coherency processing, which has been discontinued in the cluster of the access requester, is resumed, and then the data is transferred from the cluster communication control unit 500 to the processor of the access requester. Then, the response data is cached in the cache memory in a shared state in the access requester.

When it is verified as a result of the intercluster cache coherency protocol that no dirty block exists in the any other clusters, data read out from the local memory 400 in the target cluster is transferred to the cluster communication control unit 500 in the requesting cluster. At this time, if no corresponding entry exists in the export directory of the target cluster, the data is cached in the export directory as update data in a shared state. Then, the local cache coherency process which has been discontinued is resumed to determine whether or not there exists any dirty block in any other of the caches in the cluster of the access requester. If there exists a dirty block therein, an intra-cluster cache-to-cache data transfer is carried out. On this occasion, the data which was read in the target cluster and transferred up to the cluster communication control unit 500 of the requesting cluster is discarded. Further, the cache-to-cache transferred is taken into the cluster communication control unit 500 thereof to be transferred.to the target cluster where it will be written back to the local memory 400 therein. Concurrently, the corresponding entry in the export directory in the target cluster is changed from the dirty state to a shared one. Then, into the cache of the access requester the response data is cached in the shared state.

On the other hand, when it is verified after resumption of the local cache coherency processing that there exists no dirty block in any other of the cache memories in the cluster of the access requester, the data sent from the target cluster is transferred from the cluster communication control unit 500 to the cache memory of the access requester to be cached therein. On this occasion, the state of the block thereof is set in a shared state irrespective of the result of the intercluster cache coherency processing. This is because, if the data is cached in the exclusive state, the processor may readily modify the contents of its cache without reporting to the other caches, thereby causing cache inconsistency to occur with the content of the export directory in the target cluster, since it indicates a shared state.

(3) Cache Flush Access to the Local Memory in the Local Cluster

A process flow for a cache flush access to a local memory 400 in the local cluster is described below. A cache flush request from a processor 200 is broadcast to the local bus 1600 to be transmitted to the processor memory interface unit 300 and the cluster communication control unit 500. On this occasion, the other processors in the same local cluster simultaneously perform snooping of the above block read request, and then perform a cache search in their respective caches. The processor memory interface unit 300 and the cluster communication control unit 500, respectively, identify if it is an access destined to the local memory 400 within its cluster from the address of the access they receive, and then the processor memory interface unit 300 waits until a required cache coherency is completed. At this time, the cluster communication control unit 500 searches the export directory 600 for any coincidence of addresses to determine whether or not there is required an intercluster cache coherency protocol. If a miss occurs in the export directory, there is no need for inter-cluster cache coherency to be maintained. In this case, as a result of an intra-cluster cache coherency protocol within the access requesting cluster, it is judged whether there exists any dirty block in any other of the cache memories therein. If there exists any dirty block, the corresponding data thereof is transferred to the processor memory interface unit 300 so as to be written back to the local memory 400, and then the corresponding block is invalidated from the cache memories. Further, when there exists no other dirty block, the corresponding dirty block is invalidated at once.

On the other hand, if it is found as a result of a search of the export directory 600 that a corresponding entry exists in the export directory, inter-cluster cache coherency between clusters becomes -necessary. The cluster communication control unit 500 instructs the local bus to expand the current cache coherency processing be expanded, and a memory address thereof is broadcast to the cluster bus 2200 to urge inter-cluster cache coherency to be maintained. Each cluster communication control unit 500 in the other clusters performs snooping of the address that has been broadcast, and then further broadcasts the above address to each local bus 1600 in each cluster so as to execute a local cache coherency processing therein. As a result of the above inter-cluster cache coherency, it is determined whether or not any dirty block exists in any other of the clusters. If no dirty block exists in any other of the clusters, copies of a corresponding block which have been cached in cache memories in each cluster are invalidated instantly. Also, its corresponding .entry in the export directory in the cluster of the access requester is invalidated.

When there exists a dirty block in the other clusters, a corresponding data block thereof is transferred through the cluster communication control units 500 to the cluster to which the access requester belongs.. Then, the local cache coherency process which has been discontinued in the cluster to which the access requester belongs is resumed, thereby to enable transfer of the data from the cluster communication control unit 500 to the processor memory interface unit 300, and then it is written back to the local memory 400. At the same time, all copies of the target block in all of the clusters are invalidated. Further, the target entry in the export directory in the cluster of the access requester is also invalidated.

(4) Cache Flush Access to Local Memories in Remote Clusters

A process flow for a cache flush access to a local memory 400 in other clusters according to the invention will be set forth in the following. A cache flush request issued from a processor 200 is broadcast to the local bus 1600 to be transmitted therethrough to the processor memory interface unit 300 and the cluster communication control unit 500, respectively. On this occasion, other processors in the same cluster perform snooping of this block read request concurrently, and perform respective cache searches within respective caches. The processor memory interface unit 300 and the cluster communication control unit 500 respectively identify an access destined to a local memory 400 in remote clusters from the address of the access they receive. The cluster communication control unit 500 instructs the local bus such that the cache coherency processing is expanded irrespective of what the export directory 600 may indicate, and, at the same time, the memory address corresponding thereto is broadcast through the cluster bus 2200 to a target cluster while an inter-cluster cache coherency process is started as well. Each cluster communication control unit 500 in the remote clusters performs snooping of the address of the access broadcasted, and then further broadcasts the address thereof to its local bus 1600 within each cluster so as to start a required local cache coherency-process. Then, it is determined whether or not there exists any dirty block in other clusters as a result of the above inter-cluster cache coherency process. When there exists a dirty block in other clusters, the corresponding data block is transferred via associated cluster communication control units 500 to the target cluster. The target cluster, upon reception of the data, transfers the data to the processor memory interface unit 300 to write it back into its local memory 400. Further, the entry corresponding thereto in the export directory in the target cluster is invalidated. As a result of the inter-cluster cache coherency process, copies of the corresponding entry cached in cache memories in other clusters are invalidated. In parallel with this processing, the local cache coherency process which has been discontinued in the cluster to which the access requester belongs is resumed thereby to invalidate the target entry in the cache memories thereof.

When it is verified, as a result of the intercluster cache coherency protocol, that no dirty block exists in other clusters, copies of the subject block which have been cached in caches in the other clusters are invalidated, and then the local cache coherency process which has been discontinued is resumed. On this occasion, when the subject entry in the export directory in the subject cluster is in the shared state, the subject entry therein is invalidated. However, when the subject entry is in the dirty state, it is not invalidated. Then, it is judged whether there exists any dirty block in caches in the local cluster to which the access requester belongs. If any dirty block is identified to exist therein, the data thereof is transferred via cluster communication control units 500 from the cache in the cluster to the local memory 400 in the subject cluster to write it back. At the same time, the corresponding entry in the export directory in the subject cluster is also invalidated. Further, all copies of the subject block cached in the caches in the local cluster of the access requester are invalidated. On the other hand, upon resumption of the local cache coherency processing, when it is verified that no dirty block exists in the cache memories in the local cluster of the access requester, the subject block is immediately invalidated.

(5) Cache Purge Access to the Local Memory in the Local Cluster

A process flow for a cache purge access to the local memory within the same cluster will be described below. It is identical with the process flow for the cache flush access until the determination whether or not an inter-cluster cache coherency protocol is required as a result of the search in the export directory 600. In the case of a miss in the export directory, the inter-cluster cache coherency process becomes unnecessary, thereby the subject block cached in the caches in the cluster of the access requester is invalidated immediately.

In contrast, in case it is verified by the cluster communication control unit 500, as a result of a search in the export directory 600, that there exists a corresponding entry in the export directory, it becomes necessary for cache coherency to be maintained among clusters. Thereby, the cluster communication control unit 500 instructs the local bus to expand its cache coherency processing, and also broadcasts the memory address to the cluster bus 2200 to start an intercluster cache coherency process. Each cluster communication control unit 500 in remote clusters snoops the address broadcasted via the cluster bus, and further broadcasts the snooped address to its own local bus 1600 within each cluster to enable each remote local cache coherency process to be started. As a result of the above inter-cluster cache coherency process, all copies of the subject block cached in any caches are invalidated. At the same time, the associated subject entry entered in the export directory in the local cluster of the access requester is invalidated.

(6) Cache Purge Access to Local Memories in Remote Clusters

A process flow for a cache purge access to local memories in remote clusters will be described below. It is identical with the process flow for the cache flush access to the remote clusters until broadcasting to each local bus 1600 in each cluster to execute the intercluster cache coherency irrespective of the export directory 600. As a result of the above intercluster cache coherency processing, all copies of the subject block cached in the caches in any clusters are invalidated immediately. To be noted here, however, is any modification to be applied in the contents of the export directory in the subject cluster. The cache purge access includes two kinds of transactions, namely, a cache purge as per an instruction and a cache purge as per an issuance of a store access to a given cache entry in the shared state, whereby all copies of the target entry cached in all caches are required to be invalidated. For the cache purge access as per an instruction, all copies of the target entry are purged out of every one of the caches. In contrast, for the cache purge for the store access to a shared block, the target block will remain in the dirty state in the cache of the access requester. Therefore, when modifying the contents of the export directory in the subject cluster, the above two cache purge transactions must be discriminated at first, and then, when it is a cache purge by an instruction, the subject entry in the export directory 600 in the subject cluster is invalidated. On the other hand, when it is a cache purge effected by the store access to a shared block, the subject entry in the export directory 600 is not invalidated, but its memory state is modified from the shared state to the dirty state.

The following advantages and effects have been realized by the system architecture of the embodiment according to the present invention as described hereinabove. A large sized multiprocessor system has been divided into a plurality of clusters (each of which is defined by a group including a plurality of processors and a main memory), and an export directory is provided for each cluster. The export directory is a set-associative type directory which registers therein an identifier of given data of the local memory in the local cluster for which the export directory is responsible, when a copy of the given data is cached in cache memories in the other local memories in remote clusters. By such arrangement of the export directory according to the invention, it can be immediately determined whether there is required an overall cache coherency protocol including all of the clusters or whether only a limited area cache coherency protocol within the local cluster will do. Thereby, latency in the cache coherency control can be improved substantially. The advantages and effects according to the export directory of the invention are expected to be very significant and substantial since most of the cache coherency transactions can be accomplished within the local cluster without exporting the data outside thereof.

Further, the export directory of the invention advantageously eliminates the necessity of broadcasting to all of the processors throughout the system every time of memory read/write access is started, thereby making it possible to substantially reduce the inter-processor communication quantities. Still further, the capacity of the export directory can be determined independent of that of the local memory. Then, to cope with a case which arises when there occurs an overflow in the memories, there is provided an invalidating mechanism capable of invalidating copies of any corresponding block from the other clusters. Thereby, in comparison with the prior art directory type protocol which requires a large capacity of memory of 10–20 Mbytes, an excellent cache coherency protocol system with less resources and improved efficiency is implemented.

What is claimed is:

1. A multiprocessor system comprising:

a plurality of clusters of processors interconnected via a processor global bus, in which each cluster includes at least two processors having a cache memory and a translation lookaside buffer, a local shared memory, and a memory interface unit which is interconnected to said at least two processors and said local shared memory for controlling an access from said processors to said local shared memory;

a global shared memory;

a system control unit connected between said processor global bus and said global shared memory for controlling an access from a processor in any of said plurality of clusters to said global shared memory; and means responsive to area attribute information which is held in said translation lookaside buffer in each of said processors for identifying, for an access from any of said plurality of processors, whether cache coherency is to be guaranteed among cache memories in a local cluster or is to be expanded to include all cache memories in all clusters throughout the system.

2. A multiprocessor system comprising:

a plurality of clusters of processors interconnected via a processor global bus, in which each cluster includes at least two processors having a cache memory and a translation lookaside buffer, a local shared memory, and a memory interface unit which is interconnected to said at least two processors and said local shared memory for controlling an access from said processors to said local shared memory;

a global shared memory;

a system control unit connected between said processor global bus and said global shared memory for controlling an access from a processor in any of said plurality of clusters to said global shared memory; and means responsive to area attribute information which is held in said translation lookaside buffer in each of said processors for identifying, for an access from any of said plurality of processors, whether cache coherency is to be guaranteed among every one of the cache memories throughout the system, or whether cache coherency is to be maintained among cache memories in a limited area of the system.

3. A multiprocessor system comprising:

a plurality of clusters of processors interconnected via a processor global bus, in which each cluster includes at least two processors having a cache memory and a translation lookaside buffer, a local shared memory, and a memory interface unit which is interconnected to said at least two processors and said local shared memory for controlling an access from said processors to said local shared memory;

a global shared memory; and a system control unit connected between said processor global bus and said global shared memory for controlling an access from a processor in any of said plurality of clusters to said global shared memory;

wherein area attribute information is held in said translation lookaside buffer to identify, for an access from said one of said plurality of processors, whether cache coherency is to be guaranteed among every one of the cache memories throughout the system, or whether cache coherency is to be maintained among cache memories in a limited area of the system; and wherein said memory interface unit comprises cache coherency area determination means for determining a limited area of cache memories in the system which are to be guaranteed cache coherency on the basis of the area attribute information held in said translation lookaside buffer.

4. A multiprocessor system according to any one of claims 1 through 3, wherein said translation lookaside buffer comprises a plurality of entries, each entry holding area attribute information.

5. A multiprocessor system according to claim 3, wherein said cache coherent area determination means determines an area for guaranteeing cache coherency on the basis of a real address which is translated in said translation lookaside buffer from a virtual address, which is an access address received from one of said at least two processors, and based on attribute information corresponding to said real address.

6. A multiprocessor system according to claim 3 or 5, wherein said cache coherent area determination means comprises a cluster identification number register for retaining an identification number indicative of the cluster to which it belongs to, and a comparator for comparing information retained in said cluster identification number register and a real address, which is translated in said translation lookaside buffer from a virtual address of an access address received from said processor.

7. A multiprocessor system comprising:

a plurality of clusters of processors interconnected via a processor global bus, in which each cluster includes at least two processors having a cache memory and a translation lookaside buffer, a local shared memory, and a memory interface unit which is interconnected to said at least two processors and said local shared memory for controlling an access from said processors to said local shared memory;

a global shared memory; and a system control unit connected between said processor global bus and said global shared memory for controlling an access from a processor in any of said plurality of clusters to said global shared memory;

wherein area attribute information is held in said translation lookaside buffer to identify, for an access from said one of said plurality of processors, whether cache coherency is to be guaranteed among every one of the cache memories throughout the system, or whether cache coherency is to be maintained among cache memories in a limited area of the system; and wherein said memory interface unit comprises cache coherency area determination means for determining a limited area of cache memories in the system which are to be guaranteed cache coherency on the basis of the area attribute information held in said translation lookaside buffer, and broadcast means for broadcasting information for use in cache coherency to processors within a specified area specified by said cache coherency area determination means.

8. A multiprocessor system comprising:

a plurality of clusters of processors interconnected via a processor global bus, in which each cluster includes at least two processors having a cache memory and a translation lookaside buffer, a local shared memory, and a memory interface unit which is interconnected to said at least two processors and said local shared memory for controlling an access from said processors to said local shared memory;

a global shared memory; and a system control unit connected between said processor global bus and said global shared memory for controlling an access from a processor in any of said plurality of clusters to said global shared memory;

wherein area attribute information is held in said translation lookaside buffer to identify, for an access from said one of said plurality of processors, whether cache coherency is to be maintained among every one of the cache memories throughout the system, or whether cache coherency is to be maintained among cache memories in a limited area of the system; and wherein said memory interface unit comprises cache coherency area determination means for determining a limited area of cache memories in the system which are to be guaranteed cache coherency on the basis of the area attribute information held in said translation lookaside buffer, cache coherency monitor means for monitoring a cache coherency transaction for processors until its completion within a limited area specified by said cache coherency area determination means, and data supplier select means for selecting, upon completion of the cache coherency transaction, whether to execute a cache-to-cache data transfer within its own cluster, to read data from said local shared memory or to read data from said global shared memory.

9. A multiprocessor system according to claim 3, 7 or 8, wherein said memory interface unit comprises means for controlling caching, which, if an access is from one of said processors within a designated area designated by said cache coherency area determination means, permits response data being cached as a result of cache coherency in a cache memory of said one of said processors, and if the access is from a processor outside said designated area, inhibits the response data from being cached in a cache memory corresponding to said one of said processors.

10. A multiprocessor system comprising:

a plurality of processors each having a cache memory and a translation lookaside buffer;

a main memory for storing instructions and data processed by said plurality of processors;

a memory interface unit coupled to said plurality of processors and said main memory for controlling an access from said plurality of processors to said main memory;

means responsive to area attribute information, retained in said translation lookaside buffer, for identifying, for access from one of said plurality of processors, whether cache coherency should be maintained among every one of the cache memories throughout the system, or only among cache memories in a limited area of the system; and said memory interface unit comprises cache coherency area determination means for determining a limited area of cache memories in the system which are to be guaranteed cache coherency on the basis of the area attribute information held in said translation lookaside buffer.

11. A multiprocessor system comprising:

a plurality of processors having a cache memories and translation lookaside buffers;

a main memory for storing instructions and data for processing by said plurality of processors; and a memory interface unit coupled to said plurality of processors and said main memory for controlling an access from said plurality of processors to said main memory;

wherein area attribute information is held in said translation lookaside buffer for identifying, for an access from one of said plurality of processors, whether cache coherency should be maintained among every one of the cache memories throughout the system, or only among cache memories in a limited area therein; and wherein said memory interface unit comprises cache coherent area determination means for determining a cache coherent area in which cache coherency is necessitated in accordance with area attribute information held in said translation lookaside buffer.

12. A multiprocessor system according to claim 11, wherein said memory interface unit comprises broadcast means for selectively broadcasting information for use in cache coherency control to processors within a limited area specified by said cache coherent area determination means.

13. A multiprocessor system according to claim 11 or 12, wherein said memory interface unit comprises:

cache coherency monitor means for monitoring whether or not a cache coherency operation is completed among cache memories in processors within a designated area of clusters designated by said cache coherency area determination means, and data supplier select means for selecting, after completion of cache coherency, whether to carry out a cache-to-cache data transfer or to execute a data read from said main memory.

14. An area limitable processor system comprising:

a plurality of processors each of which includes:

an instruction cache memory which retains a part of instructions stored in a main memory, a data cache memory which retains a part of data stored in said main memory, an instruction fetch unit which reads out an instruction to be executed from said instruction cache memory or from said main memory, an instruction execution unit which interprets the instruction fetched by said instruction fetch unit, then reads out a data from said data cache memory or said main memory so as to execute thusly interpreted instruction, and a translation lookaside buffer which translates a virtual address issued from said instruction fetch unit or said instruction execution unit into a real address, wherein said translation lookaside buffer includes a memory space for holding area attribute information which defines a limited area in which cache coherency is to be maintained among a plurality of cache memories of said plurality of processors.

15. A distributed-memory type multiprocessor system having a cache memory coherency protocol function, comprising:

a plurality of clusters coupled to each other via a cluster communication control unit therefor, each cluster being defined by a group, including:

a plurality of processors including built-in cache memories, and a local memory connected to said plurality of processors, said cluster communication control unit connected to said plurality of processors and said local memory, wherein said cluster communication control unit comprises a small capacity export directory which only holds an address of data in said local memory in a local cluster a copy of which is exported in a cache memory in a remote cluster; and cache coherency area determination means for determining whether cache coherency is guaranteed among every cache memory throughout the system or only among cache memories within the local cluster dependent upon the contents of said export directory.

16. A distributed-memory type multiprocessor system with a cache memory coherency protocol function, comprising:

a plurality of clusters coupled each to other via a cluster communication control unit and a cluster bus, in which each cluster is defined by a group, including:

a plurality of processors including built-in cache memories, a local bus for connecting said plurality of processors, a local memory coupled to said local bus, and said cluster communication control unit connected to said local bus, wherein each of said plurality of processors comprises a local bus cache coherency protocol function for monitoring said local bus and performing a cache coherency protocol as required, wherein said cluster communication control unit comprises:

a local bus cache coherency protocol function for monitoring said local bus whereby a necessitated cache coherency protocol is executed, a cluster bus cache coherency protocol function for monitoring said cluster bus whereby a necessitated cache coherency protocol is executed among clusters, and an export directory with a small capacity of memory for holding only an address of data in said local memory in its own cluster a copy of which is exported in a cache memory in a remote cluster; and means for determining whether it is necessary to tie up said local bus cache coherency protocol function with said cluster bus cache coherency protocol function or its cache coherency protocol may be accomplished separately by said local bus cache coherency protocol function alone without resorting to such a tie-up operation dependent upon the contents of said export directory.

* * * * *